(12) United States Patent
Moriya et al.

(10) Patent No.: US 7,826,709 B2
(45) Date of Patent: Nov. 2, 2010

(54) METADATA EDITING APPARATUS, METADATA REPRODUCTION APPARATUS, METADATA DELIVERY APPARATUS, METADATA SEARCH APPARATUS, METADATA RE-GENERATION CONDITION SETTING APPARATUS, METADATA DELIVERY METHOD AND HINT INFORMATION DESCRIPTION METHOD

(75) Inventors: Yoshimi Moriya, Tokyo (JP); Hirofumi Nishikawa, Tokyo (JP); Shunichi Sekiguchi, Tokyo (JP); Kohtaro Asai, Tokyo (JP); Yoshihisa Yamada, Tokyo (JP); Kenji Otoi, Tokyo (JP); Shinichi Kuroda, Tokyo (JP); Fuminobu Ogawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1483 days.

(21) Appl. No.: 10/510,548

(22) PCT Filed: Mar. 20, 2003

(86) PCT No.: PCT/JP03/03450

§ 371 (c)(1),
(2), (4) Date: Oct. 8, 2004

(87) PCT Pub. No.: WO03/088665

PCT Pub. Date: Oct. 23, 2003

(65) Prior Publication Data

US 2005/0149557 A1 Jul. 7, 2005

(30) Foreign Application Priority Data

Apr. 12, 2002 (JP) .............................. 2002-110259
Jun. 19, 2002 (JP) .............................. 2002-178169

(51) Int. Cl.
*H04N 5/93* (2006.01)
*G06F 13/00* (2006.01)
*G06F 17/00* (2006.01)
*G06K 9/60* (2006.01)

(52) U.S. Cl. .................. 386/52; 382/305; 715/201; 715/204; 715/255; 725/51

(58) Field of Classification Search ............. 707/104.1, 707/1, E17.009, E17.028, E17.029; 348/E5.002, 348/E5.007, E5.008; 375/E7.007, E7.024; 386/E5.001; 715/201, 204, 255; 725/51; G9B/27.051; 382/305
See application file for complete search history.

(56) References Cited

U.S. PATENT DOCUMENTS

| 6,370,316 | B1 | 4/2002 | Yamada et al. | |
|---|---|---|---|---|
| 6,704,029 | B1 | 3/2004 | Ikeda et al. | |
| 7,082,255 | B1 | 7/2006 | Jun | |
| 7,212,972 | B2 | 5/2007 | Sugano et al. | |
| 2001/0038719 | A1* | 11/2001 | Onuki et al. | 382/305 |
| 2002/0019833 | A1* | 2/2002 | Hanamoto | 707/500 |
| 2002/0052864 | A1* | 5/2002 | Yamamoto | 707/1 |
| 2002/0059604 | A1* | 5/2002 | Papagan et al. | 725/51 |

FOREIGN PATENT DOCUMENTS

| CN | 1382288 A | 11/2002 |
|---|---|---|
| JP | 8-32924 A | 2/1996 |
| JP | 9-154097 A | 6/1997 |
| JP | 9-247602 A | 9/1997 |
| JP | 11-238071 A | 8/1999 |
| JP | 2000-299829 A | 10/2000 |
| JP | 2001-008136 A | 1/2001 |
| JP | 2001-28722 A | 1/2001 |
| JP | 2001-167099 A | 6/2001 |
| JP | 2001-167109 A | 6/2001 |
| JP | 2001-184371 A | 7/2001 |
| JP | 2001-320693 A | 11/2001 |
| JP | 2001-326901 A | 11/2001 |
| JP | 2001-357008 A | 12/2001 |
| JP | 2002-41541 A | 2/2002 |
| JP | 2002-51287 A | 2/2002 |
| JP | 2003-67397 A | 3/2003 |
| KR | 2001-0028251 A | 4/2001 |
| KR | 2002-0009757 A | 2/2002 |

| | | | |
|---|---|---|---|
| WO | WO 97/34240 A1 | 9/1997 |
| WO | WO 01/24045 A | 4/2001 |
| WO | WO-01/27876 A1 | 4/2001 |
| WO | WO-01/69936 A2 | 9/2001 |
| WO | WO-01/97044 A1 | 12/2001 |
| WO | 02/05089 A1 | 1/2002 |

OTHER PUBLICATIONS

Adami et al., "Multimedia Documents Description by Ordered Hierarchies: The Tocai Description Scheme", Multimedia and EXPO, IEEE, 2000, vol. 2, pp. 781-784.
Smith et al., "A Visual Annotation Tool for Multimedia Content Description", Proc. Of SPIE, vol. 4210, pp. 49-59, XP009048180 (2000).
Woudstra et al., "Modeling and Retrieving Audiovisual Information—A Soccer Video Retrieval System", Advances in Multimedia Information Systems. 4th International Workshop, pp. 161-173, XP-002506355 (1998).
Chakraborty et al., "Authoring and Viewing Video Documents using an SGML structure", Multimedia Computing and Systems, 1999, IEEE, vol. 2, pp. 654-660.
Herng-Yow Chen et al., "A Synchronized and Retrievable Video/HTML Lecture System for Industry Employee Training", Industrial Electronics Society, EEE 1999, vol. 2, pp. 750-755.
Du Chen et al., "A Video Self-Describing Scheme in MPEG-7", Circuits and Systems, 2000, IEEE, pp. 117-120.
APPLEN "Extensible Markup Languages and Traditional Abstracting and Indexing Strategies," IEEE Transactions on Professional Communication, vol. 44, No. 3, Sep. 2001, pp. 202-206.
Goldman et al., "DataGuides: Enabling Query Formulation and Optimization in Semistructured Databases." Proceedings of the 23rd VLDB Conference, Athens, Greece, pp. 436-445, Stanford University, California, USA, Aug. 26, 1997.
Hu et al., "MD2L: Content Description of Multimedia Documents for Efficient Process and Search/Retrieval," Sixth IEEE Forum on Research and Technology Advances in Digital Libraries (ADL '99), pp. 200-213, Baltimore, Maryland, May 19, 1999.
Lee et al., "Comparative Analysis of Six XML Schema Languages," SIGMOD Record ACM USA, vol. 29, No. 3, Sep. 2000, pp. 76-87.
Sekiguchi et al., "Description for Metadata Adaptation Hint," Joint Video Team (JVT) of ISO/IEC MPEG & ITU-T VCEG(ISO/IEC JTC1/SC29/WG11 and ITU-T SG16 Q6). No. M8324, pp. 1-5. Fairfax, USA Apr. 27, 2002.
Hunter, Jane, "An Overview of the MPEG-7 Description Definition Language (DDL)," IEEE Transactions on Circuits and Systems for Video Technology, vol. 11, No. 6, pp. 765-772, Jun. 2001.
Shibata, Masahiro, "Standardization Activities of MPEG-7," Standardization Activities of Content Description-MPEG-7, vol. 55, No. 3, pp. 337-343, Mar. 20, 2001.

* cited by examiner

*Primary Examiner*—Thai Tran
*Assistant Examiner*—Syed Y Hasan
(74) *Attorney, Agent, or Firm*—Birch, Stewart, Kolasch & Birch, LLP

(57) ABSTRACT

Multimedia content containing moving pictures and audio is divided into multiple scenes and metadata is generated for each of the scenes obtained as a result of the division. It is possible to generate metadata containing scene structure information metadata that describes the hierarchical structure of the content in addition to scene section information and titles. Also, a name or an identifier of each descriptor contained in the metadata is described as hint information for manipulation of metadata composed of at least one descriptor describing semantic content, a structure, and characteristics of content.

2 Claims, 23 Drawing Sheets

FIG. 2

| NEWS DIGEST | DOMESTIC NEWS | INTER-NATIONAL NEWS | FINANCIAL NEWS | SPECIAL | SPORTS SOCCER | SPORTS BASEBALL | WEATHER FORECAST |

FIG. 16

METADATA OPTIMIZATION HINT INFORMATION

METADATA FILE INFORMATION:
  METADATA FILE LOCATION
  METADATA FILE SIZE
  METADATA FILE FORMAT
  SYNTAX FILE INFORMATION
  NUMBER OF APPEARING ELEMENTS

METADATA CONSTRUCTION ELEMENT INFORMATION: ...(1)
  NAME OF DESCRIPTOR
  APPEARING FREQUENCY IN METADATA
  COMPLETENESS OF DESCRIPTION
  HIERARCHICAL PROPERTY (TIME/SPACE) (MAXIMUM VALUE OF DEPTH)
  APPEARING POSITION
  CONTENTS OF DESCRIPTOR (TYPE, RANGE OF ASSUMABLE VALUES)
※DESCRIPTION BELOW (1) IS REPEATED FOR EACH PIECE OF METADATA CONSTRUCTION ELEMENT INFORMATION

FIG. 17

```
METADATA OPTIMIZATION HINT INFORMATION
  METADATA FILE INFORMATION:
  METADATA FILE LOCATION: http//xxx.xxx.xx.xx/xxx/xxxx
  METADATA FILE SIZE: 120KB
  METADATA FILE FORMAT: XML
  SYNTAX FILE INFORMATION: urn:mpeg:mpeg7:schema:2001 Mpeg7-2001.xsd
  NUMBER OF APPEARING ELEMENTS: 150
  METADATA CONSTRUCTION ELEMENT INFORMATION:
    NAME OF DESCRIPTOR: VIDEO SEGMENT
    APPEARING FREQUENCY IN METADATA: 30
    COMPLETENESS OF DESCRIPTION: No
    TIME HIERARCHICAL PROPERTY(MAXIMUM VALUE OF DEPTH): 4
    SPACE HIERARCHICAL PROPERTY(MAXIMUM VALUE OF DEPTH): 1
    METADATA CONSTRUCTION ELEMENT:
      NAME OF DESCRIPTOR: TITLE
        APPEARING FREQUENCY IN METADATA: 3
        APPEARING POSITION (ID LIST): "Root", "Scene1", "Scene2"
        CONTENTS OF DESCRIPTOR:
          DATA TYPE: CHARACTER STRING DATA LIST
          VALUE: "SOCCER GAME PROGRAM",
                 "FIRST HALF", "SECOND HALF"
    METADATA CONSTRUCTION ELEMENT INFORMATION:
      NAME OF DESCRIPTOR: IMPORTANCE
        APPEARING FREQUENCY IN METADATA: 20
        COMPLETENESS OF DESCRIPTION: No
        APPEARING POSITION (TIME HIERARCHICAL LEVEL): 3
        CONTENTS OF DESCRIPTOR:
          DATA TYPE: FLOATING-POINT DATA LIST
          VALUE: 0.0,0.25,0.5,0.75,1.0
```

METADATA EDITING APPARATUS, METADATA REPRODUCTION APPARATUS, METADATA DELIVERY APPARATUS, METADATA SEARCH APPARATUS, METADATA RE-GENERATION CONDITION SETTING APPARATUS, METADATA DELIVERY METHOD AND HINT INFORMATION DESCRIPTION METHOD

TECHNICAL FIELD

The present invention relates to a metadata editing apparatus, a metadata reproduction apparatus, a metadata delivery apparatus, a metadata search apparatus, a metadata re-generation condition setting apparatus, a content delivery apparatus, and a metadata delivery method, with which, for instance, multimedia content containing moving pictures and audio is divided into multiple scenes and metadata is generated for each of the scenes obtained as a result of the division.

BACKGROUND ART

A conventional moving picture management apparatus is known which includes: a means for dividing a video into multiple scenes and editing and creating at least one index as an assembly of section information necessary for reproduction of each scene, a scene number assigned to each scene, and a representative image of each scene; means for giving a title to each index for the purpose of searching; and means for searching for a desired index using a corresponding title and successively reproducing scenes of the index in order of the scene numbers. With this construction, it becomes possible to reproduce only necessary scenes by editing an index in which the necessary scenes are arranged (see Japanese Patent Laid-Open No. 2001-028722 (page 1, FIG. 1), for instance).

With the moving picture management apparatus described above, however, metadata is merely created using the section information necessary for the scene reproduction, the scene number, and the scene representative image. Therefore, there remains a problem that it is impossible to also manage the structure of video data such as the hierarchical property of the video data.

Also, at the time of searching for a registered image, the title given to a corresponding index is used, causing a disadvantage in that in order to obtain an appropriate search result, an appropriate title needs to be input.

The present invention has been made in order to solve the problems described above. Therefore, it is an object of the present invention to provide a metadata editing apparatus capable of generating metadata that is index information showing the structure and the like of content (video data, for instance) in addition to scene section information and titles.

It is another object of the present invention to provide a metadata reproduction apparatus, a metadata delivery apparatus, a metadata search apparatus, a metadata re-generation condition setting apparatus, a content delivery apparatus, and a metadata delivery method, with which it is possible to collect and reproduce only scenes which a user wishes to watch using the metadata generated by the metadata editing apparatus, or to search for the scenes desired by the user using characteristic amounts or the like described in the metadata.

DISCLOSURE OF INVENTION

A metadata editing apparatus according to the present invention is provided with: a scene division unit for dividing multimedia content containing at least one of moving pictures and audio into a plurality of scenes to generate scene section information metadata indicating a scene start position and a scene end position for each scene obtained as a result of the division; a scene description edit unit for performing hierarchical editing of each scene of the multimedia content based on the scene section information metadata sent from the scene division unit and generating scene structure information metadata describing a hierarchical structure of the multimedia content; and a metadata description unit for integrating the scene section information metadata and the scene structure information metadata and generating metadata describing contents and a structure of the multimedia content in accordance with a predetermined format.

Further a metadata delivery apparatus according to the present invention is provided with: a hint information analysis unit for analyzing metadata optimization hint information describing a type and content of each descriptor contained in metadata; a metadata analysis/re-generation unit for analyzing metadata describing contents and a structure of multimedia content containing at least one of moving pictures and audio based on the analyzed metadata optimization hint information and a condition for metadata re-generation and re-generating second metadata; and a metadata delivery unit for delivering the second metadata re-generated by the metadata analysis/re-generation unit to a client terminal.

Further a metadata delivery method according to the present invention includes the steps of: analyzing metadata optimization hint information describing a type of each descriptor contained in metadata; re-generating second metadata by analyzing the metadata describing contents and a structure of multimedia content containing at least one of moving pictures and audio based on the analyzed metadata optimization hint information and a condition for re-generation of the metadata; and delivering the re-generated second metadata to a client terminal.

Further a hint information description method according to the present invention includes the steps of: describing, as hint information for manipulation of metadata composed of at least one descriptor describing semantic content, a structure, and characteristics of content, a name or an identifier of each descriptor contained in the metadata.

BRIEF DESCRIPTION OF THE DRAWINGS

FIG. 2 shows a news video that is an example of a target of editing by the metadata editing apparatus according to the first embodiment of the present invention.

FIG. 16 shows an example of a format of the metadata optimization hint information used by the metadata delivery server according to the fifth embodiment of the present invention.

FIG. 17 shows the metadata optimization hint information used by the metadata delivery server according to the fifth embodiment of the present invention.

BEST MODE FOR CARRYING OUT THE INVENTION

Embodiments of the present invention will now be described with reference to the accompanying drawings, with a first embodiment relating to a metadata editing apparatus, a second embodiment relating to another metadata editing apparatus, a third embodiment relating to a metadata reproduction apparatus, a fourth embodiment relating to a content delivery system, a fifth embodiment relating to a metadata delivery server, a sixth embodiment relating to a metadata search server, a seventh embodiment relating to a client terminal, and an eighth embodiment relating to a content delivery server.

First Embodiment

In this first embodiment, a metadata editing apparatus will be described which divides multimedia content containing moving pictures and audio into multiple scenes and creates metadata (index information) containing descriptions of a scene hierarchical structure and characteristic amounts of each scene.

Figure 1:
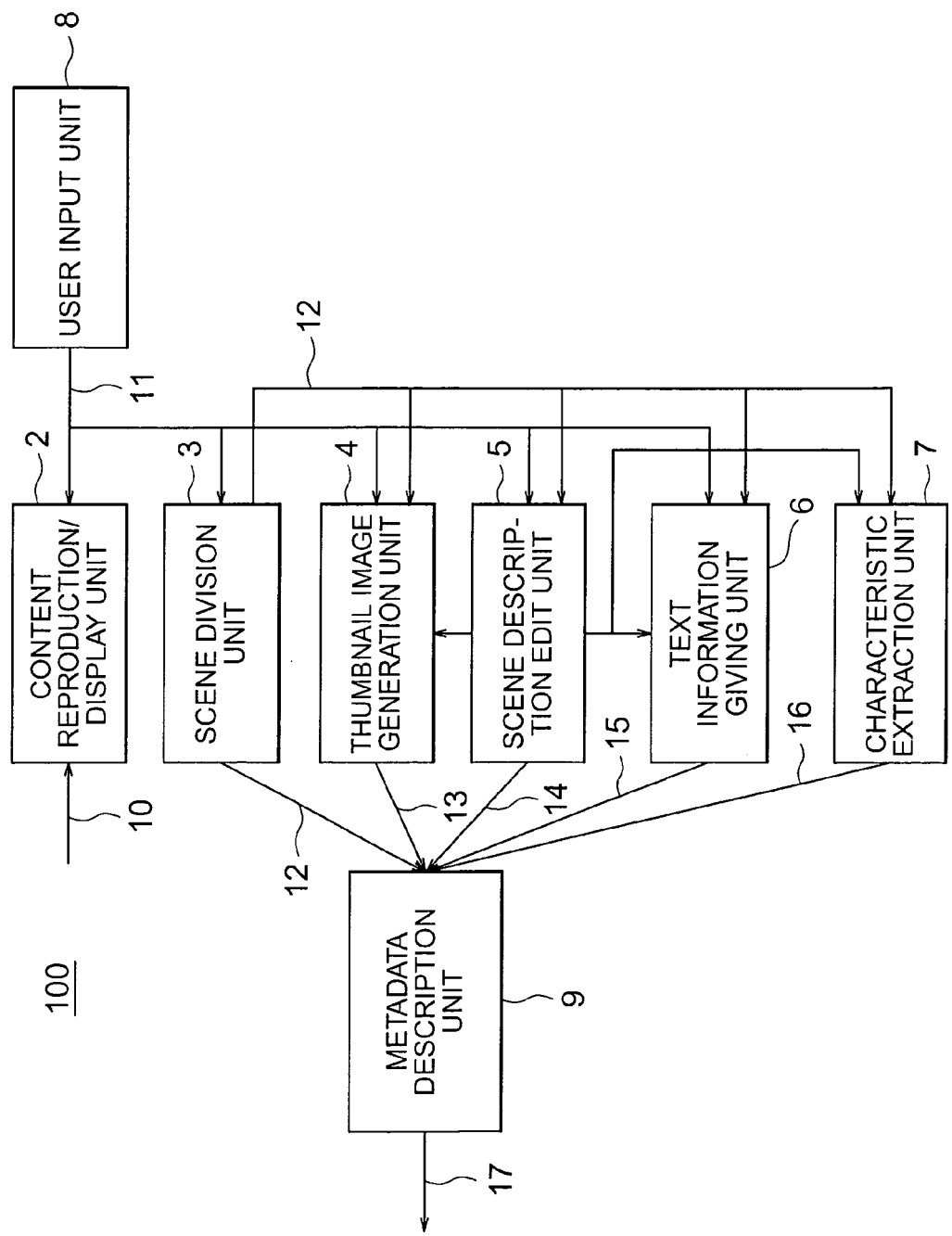
FIG. 1 is a block diagram showing a construction of a metadata editing apparatus according to a first embodiment of the present invention.

The metadata editing apparatus according to the first embodiment of the present invention will be described with reference to the accompanying drawings. FIG. 1 is a block diagram showing a construction of the metadata editing apparatus according to the first embodiment of the present invention. Note that in each drawing, the same reference numerals denote the same or equivalent portions.

Referring to FIG. 1, a metadata editing apparatus 100 includes a content reproduction/display unit 2, a scene division unit 3, a thumbnail image generation unit 4, a scene description edit unit 5, a text information giving unit 6, a characteristic extraction unit 7, a user input unit 8, and a metadata description unit 9.

The content reproduction/display unit 2 reproduces and displays multimedia content 10 that includes video data and audio data and is a target of editing. The scene division unit 3 divides the content into multiple scenes. The thumbnail image generation unit 4 extracts a representative frame of each scene as a thumbnail image. The scene description edit unit 5 hierarchically edits the scenes obtained as a result of the division by the scene division unit 3 through scene grouping, scene combining, scene deletion, generation of information that shows relations among the scenes, and the like. The text information giving unit 6 gives various types of text information to each scene. The characteristic extraction unit 7 extracts characteristics of each scene.

Also, the user input unit 8 receives input of designation information from a user and outputs it to the content reproduction/display unit 2, the scene division unit 3, the thumbnail image generation unit 4, the scene description edit unit 5, and the text information giving unit 6 as user input information 11.

Further, the metadata description unit 9 integrates scene section information metadata 12, scene thumbnail image information metadata 13, scene structure information metadata 14, text information metadata 15, and characteristic description metadata 16 outputted from the scene division unit 3, the thumbnail image generation unit 4, the scene description edit unit 5, the text information giving unit 6, and the characteristic extraction unit 7, respectively. The metadata description unit 9 then generates metadata 17 describing the contents and structure of the multimedia content in accordance with a specified format.

Next, how the metadata editing apparatus according to the first embodiment operates will be described with reference to the accompanying drawings. FIG. 2 shows a construction of a news video that is an example of a target of editing by the metadata editing apparatus according to the first embodiment.

A case where the news video having the construction shown in FIG. 2 is edited will be described as an example.

First, the content reproduction/display unit 2 of the metadata editing apparatus 100 receives input of the multimedia content 10, such as video content, stored in a content storage unit (not shown) via a network or the like, and reproduces/displays the multimedia content 10 for editing.

When the user of the metadata editing apparatus 100 inputs positions for clipping a scene, which is to say a scene start position and a scene end position, using the user input unit 8 while watching the reproduced video, the scene division unit 3 generates the scene section information metadata 12 showing the scene start position and the scene end position inputted from the user.

Figure 3:
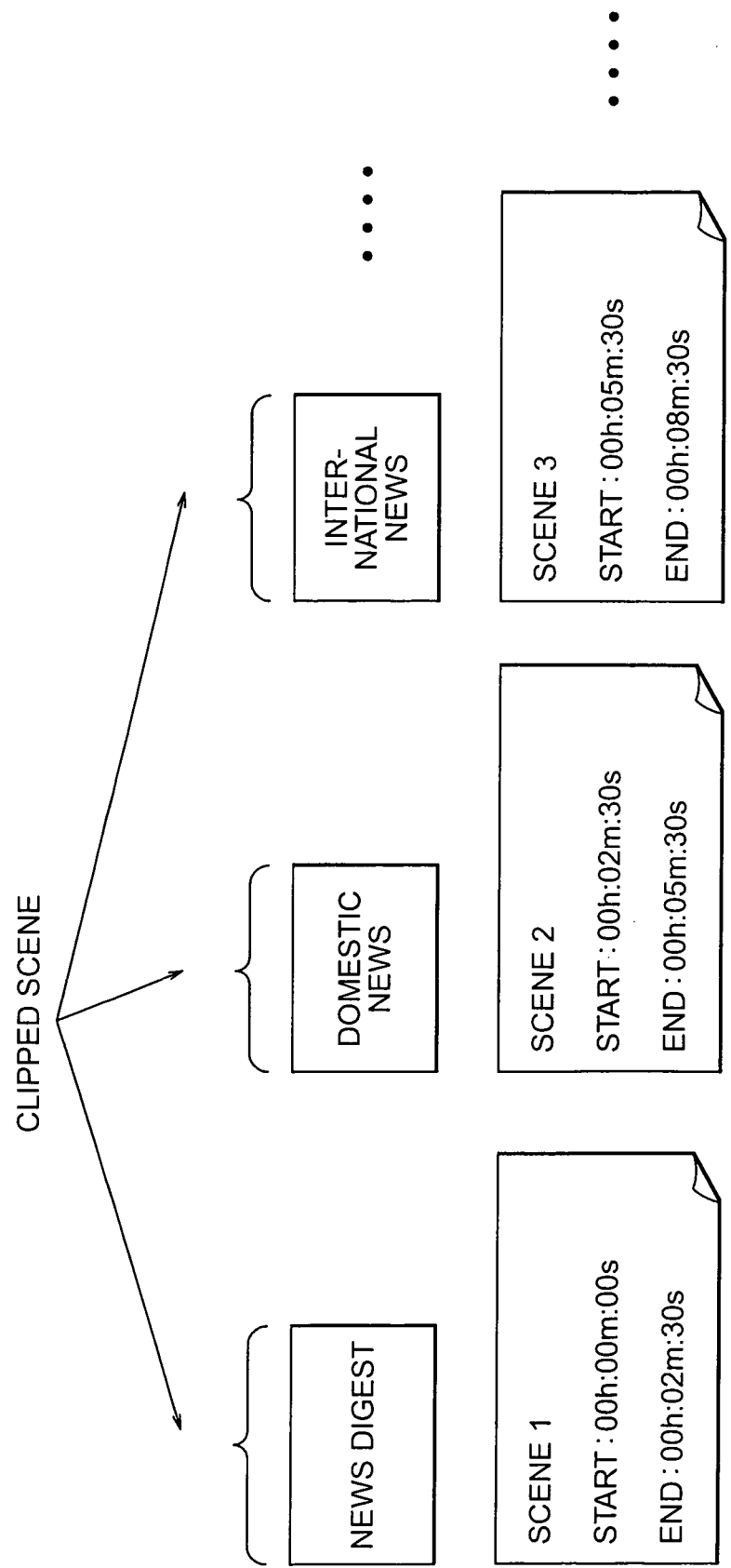
FIG. 3 shows an example of scene section information metadata of a scene division unit of the metadata editing apparatus according to the first embodiment of the present invention.

FIG. 3 shows an example of the scene section information metadata generated by the scene division unit of the metadata editing apparatus according to the first embodiment.

Here, the scene section information metadata 12 shown in FIG. 3 was generated from the news video shown in FIG. 2. As shown in FIG. 3, the scene section information metadata 12 generated by the scene division unit 3 gives the scene start position and the scene end position of each scene clipped from the news video content, such as a "news digest" scene, a "domestic news" scene, and an "international news" scene.

Figure 4:
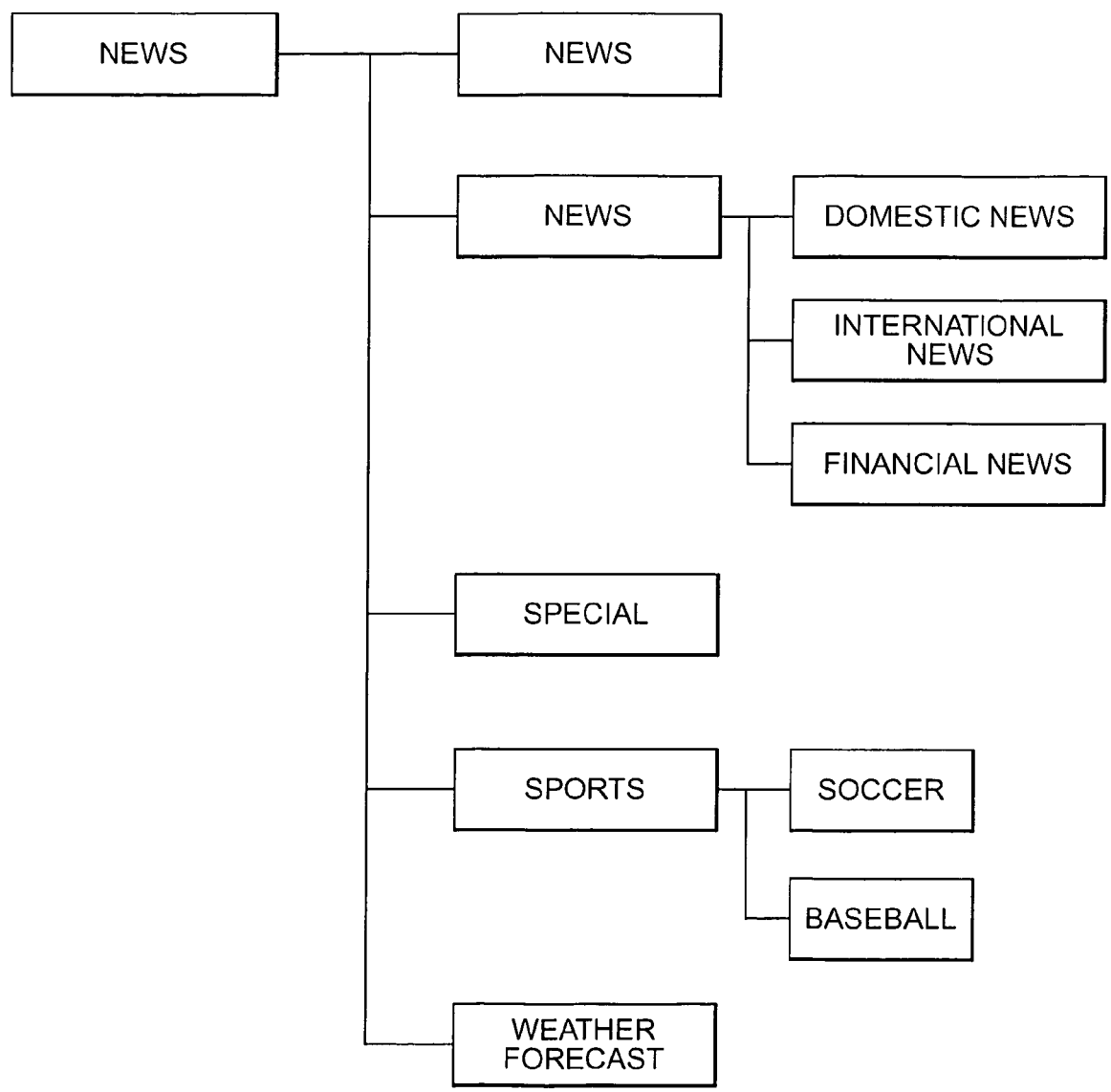
FIG. 4 shows an example of scene structure information metadata of a scene description edit unit of the metadata editing apparatus according to the first embodiment of the present invention.

On receiving designation of scene editing from the user via the user input unit 8, the scene description edit unit 5 performs hierarchical editing of the scenes continuously clipped by the scene division unit 3 based on the scene section information metadata 12 from the scene division unit 3, and then outputs the scene structure information metadata 14. Here, the scene hierarchical editing refers to scene grouping, scene re-division, scene combining, or scene deletion, for instance. The scene grouping refers to grouping of scenes that are related to each other with respect to specific characteristics into a single group. For instance, as shown in FIG. 4, the "domestic news" scene, the "international news" scene, and the "financial news" scene of the news video shown in FIG. 2 are grouped into a single "news" group. Also, the scene re-division refers to division of a single scene into multiple scenes and the scene combining refers to generation of a single scene by combining multiple scenes with each other.

FIG. 4 shows an example of the scene structure information metadata generated by the scene description edit unit of the metadata editing apparatus according to the first embodiment.

The scene structure information metadata 14 shown in FIG. 4 describes the hierarchical structure of the video content generated as a result of the editing by the scene description edit unit 5. In FIG. 4, a "news" scene is edited into multiple scenes, such as a "news digest" scene, a "news" scene, a "special" scene, and a "sports" scene, and the "news" scene is further hierarchically edited into a "domestic news" scene, an "international news" scene, and an "financial news" scene by the scene description edit unit S through scene editing such as the scene grouping, scene re-division, and scene combining.

Then, the metadata 14 generated by the scene description edit unit 5, such as the metadata shown in FIG. 4, is outputted to the metadata description unit 9.

On the other hand, the thumbnail image generation unit 4 generates a representative frame of each scene clipped by the scene division unit 3 as a thumbnail image based on the scene section information metadata 12 from the scene division unit 3, and outputs information concerning the generated thumbnail image as the thumbnail image information metadata 13 to the metadata description unit 9, in which the thumbnail image information metadata 13 is registered. Here, it is possible for the user to perform selection of the thumbnail using the user input unit 8, although it is also possible to automatically set a head frame or each frame clipped at fixed time intervals as the representative frame or to automatically detect each scene change point and set a frame at each detected point as there presentative frame. The thumbnail image information metadata 13 is information showing the position (such as the frame number or time) of the thumbnail in the video content or information giving the location (such as the URL) of the thumbnail image.

Also, the characteristic extraction unit 7 extracts visual characteristic amounts possessed by each scene, such as motions, colors, or shapes of objects contained in the scene, from the scene based on the scene section information metadata 12 from the scene division unit 3. The extracted characteristic amounts are out putted to the metadata description unit 9 as the characteristic description metadata 16 and are registered therein.

Also, the text information giving unit 6 gives various types of text information, such as a title, an abstract, a keyword, a comment, and scene importance, designated by the user to each scene based on the scene section information metadata 12 from the scene division unit 3. Here, the text information may be given through user's input using the user input unit 8 or be automatically given through analysis of audio information and captions contained in the content. The text information is outputted to the metadata description unit 9 and is registered therein as the text information metadata 15.

Figure 5:
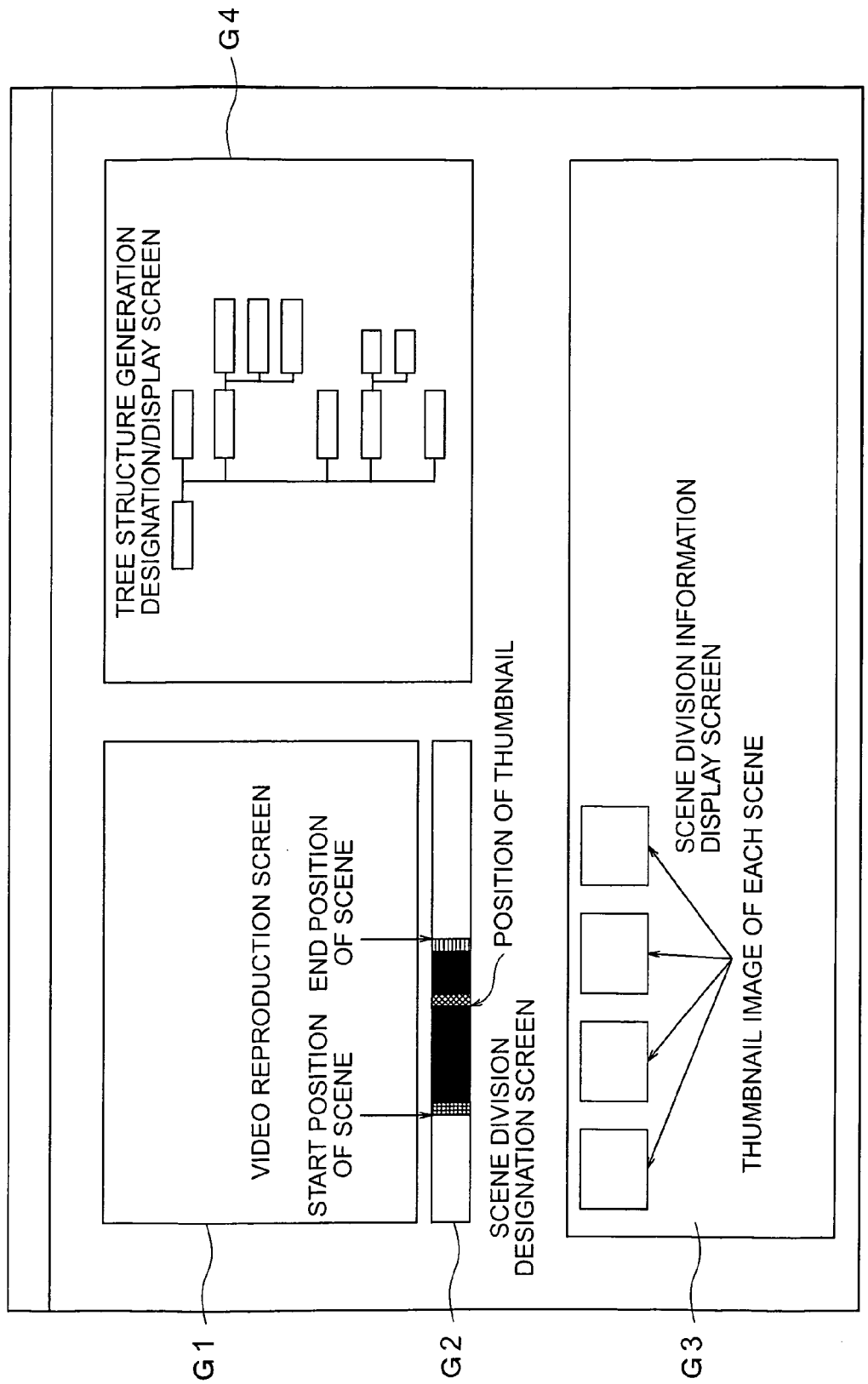
FIG. 5 shows examples of screen images of a content reproduction/display unit and a user input unit of the metadata editing apparatus according to the first embodiment of the present invention.

FIG. 5 shows examples of screen images displayed by the content reproduction/display unit and the user input unit 8 of the metadata editing apparatus according to the first embodiment. In FIG. 5, a video reproduction screen G1 is an example of the screen image displayed by the content reproduction/display unit 2, with content to be edited being reproduced/displayed on this video reproduction screen G1. Although not clearly shown in FIG. 5, like in the case of an ordinary video reproduction apparatus, a user interface is also provided which includes buttons and the like for commanding "reproduction", "stop", "rewind", "fast forward", "frame advance", and other operations. Also, below the video reproduction screen G1, a scene division designation screen G2 is displayed which has a slider form, for instance. The user designates a scene start position and a scene end position of the video displayed on the video reproduction screen G1 through this scene division designation screen G2 while watching the video displayed on the video reproduction screen G1. Also, the user simultaneously designates the position of a thumbnail between the scene start position and the scene end position through the scene division designation screen G2. Here, when the thumbnail position is designated through the scene division designation screen G2, the thumbnail image generation unit 4 generates a thumbnail image from a frame of the video content at the designated position.

Also, the thumbnail image, whose position has been designated through the scene division designation screen G2, is displayed on a scene division information display screen G3 as scene division information. Here, on this scene division information display screen G3, it is also possible to display information showing the scene start position and the scene end position in addition to the thumbnail image, as shown in FIG. 3.

Next, the user designates scene editing through a tree structure generation designation/display screen G4. That is, the user generates a tree showing the hierarchical structure possessed by the video content while watching the scene division information, such as the thumbnail image, displayed on the scene division information display screen G3.

When performing the scene grouping, the user uses a manipulation method with which, for instance, a new node is added to the tree and each scene that should be grouped is added to the node. In order to perform the scene addition, the user may use a method with which a scene that should be added is selected on the scene division information display screen G3 and the selected scene is added to the node by a drag-and-drop operation. Here, it is possible for the user to input text information for the selected scene from the scene division information display screen G3 or the tree structure generation designation/display screen G4 using the user input unit 8 provided as a user interface for giving the text information to the scene via the text information giving unit 6.

The metadata description unit 9 generates a metadata file described in accordance with a specified description format by integrating the various types of metadata outputted from the scene division unit 3, the thumbnail image generation unit 4, the scene description edit unit 5, the text information giving unit 6, and the characteristic extraction unit 7. The specified metadata description format may be a uniquely determined format, although MPEG-7 standardized by ISO is used in this first embodiment. The MPEG-7 stipulates a format for describing the structure and characteristics of content and includes an XML file format and a binary format.

As described above, the metadata editing apparatus 100 of the first embodiment is provided with the scene description edit unit 5 for hierarchically editing scenes and the characteristic extraction unit 7 for extracting characteristics from the scenes, so that it becomes possible to generate metadata describing the hierarchical structure possessed by content, such as video data, and characteristic amounts of each scene.

It should be noted here that the multimedia content 10 inputted into the content reproduction/display unit 2 is obtained from a content server (not shown) existing on a network, from a content storage unit (not shown) in the metadata editing apparatus 100, or from an accumulation medium (not shown) such as a CD or a DVD, for instance. In a like manner, the metadata outputted from the metadata description unit 9 is accumulated in a metadata server (not shown) existing on a network, in a metadata accumulation unit (not shown) in the metadata editing apparatus, or in an accumulation medium (not shown), such as a CD or a DVD, together with content, for instance.

Also, in the first embodiment, a case where the metadata editing apparatus 100 is provided with both of the scene description edit unit 5 and the characteristic extraction unit 7 has been described. However, the present invention is not limited to this and it is of course possible to provide the metadata editing apparatus 100 with only one of the scene description edit unit 5 and the characteristic extraction unit 7.

Second Embodiment

In the first embodiment described above, every scene is divided manually. However, a metadata editing apparatus to be described in this second embodiment is provided with a scene change detection unit for automatically detecting each scene change point.

Figure 6:
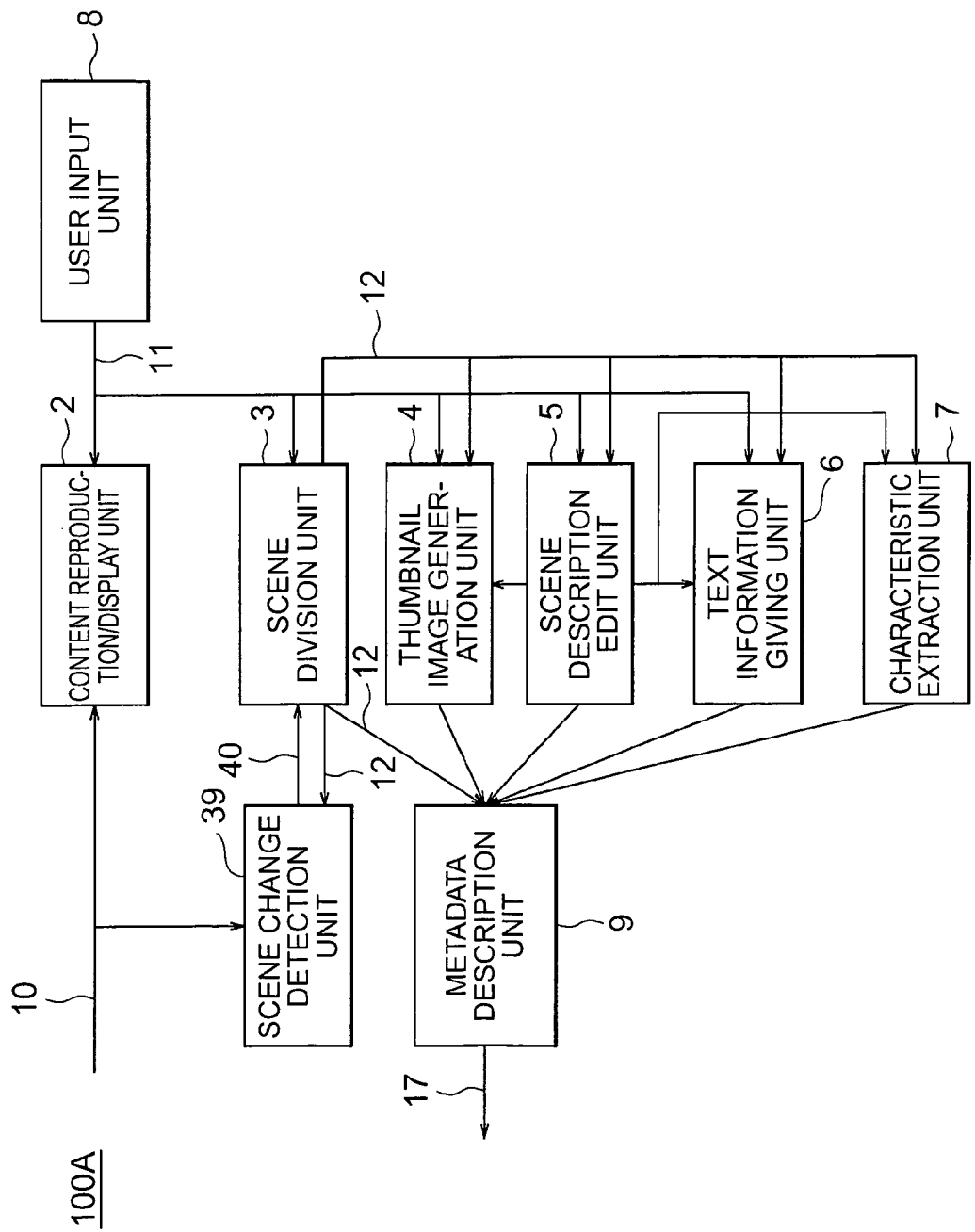
FIG. 6 is a block diagram showing a construction of a metadata editing apparatus according to a second embodiment of the present invention.

The metadata editing apparatus according to the second embodiment of the present invention will be described with reference to the accompanying drawings. FIG. 6 is a block diagram showing a construction of the metadata editing apparatus according to the second embodiment of the present invention.

Referring to FIG. 6, a metadata editing apparatus 100A includes a content reproduction/display unit 2, a scene division unit 3, a thumbnail image generation unit 4, a scene description edit unit 5, a text information giving unit 6, a characteristic extraction unit 7, a user input unit 8, a metadata description unit 9, and scene change detection unit 39. Note that reference numeral 40 denotes scene start position information which is automatically detected.

Next, how the metadata editing apparatus according to the second embodiment operates will be described with reference to the accompanying drawings.

Figure 7:
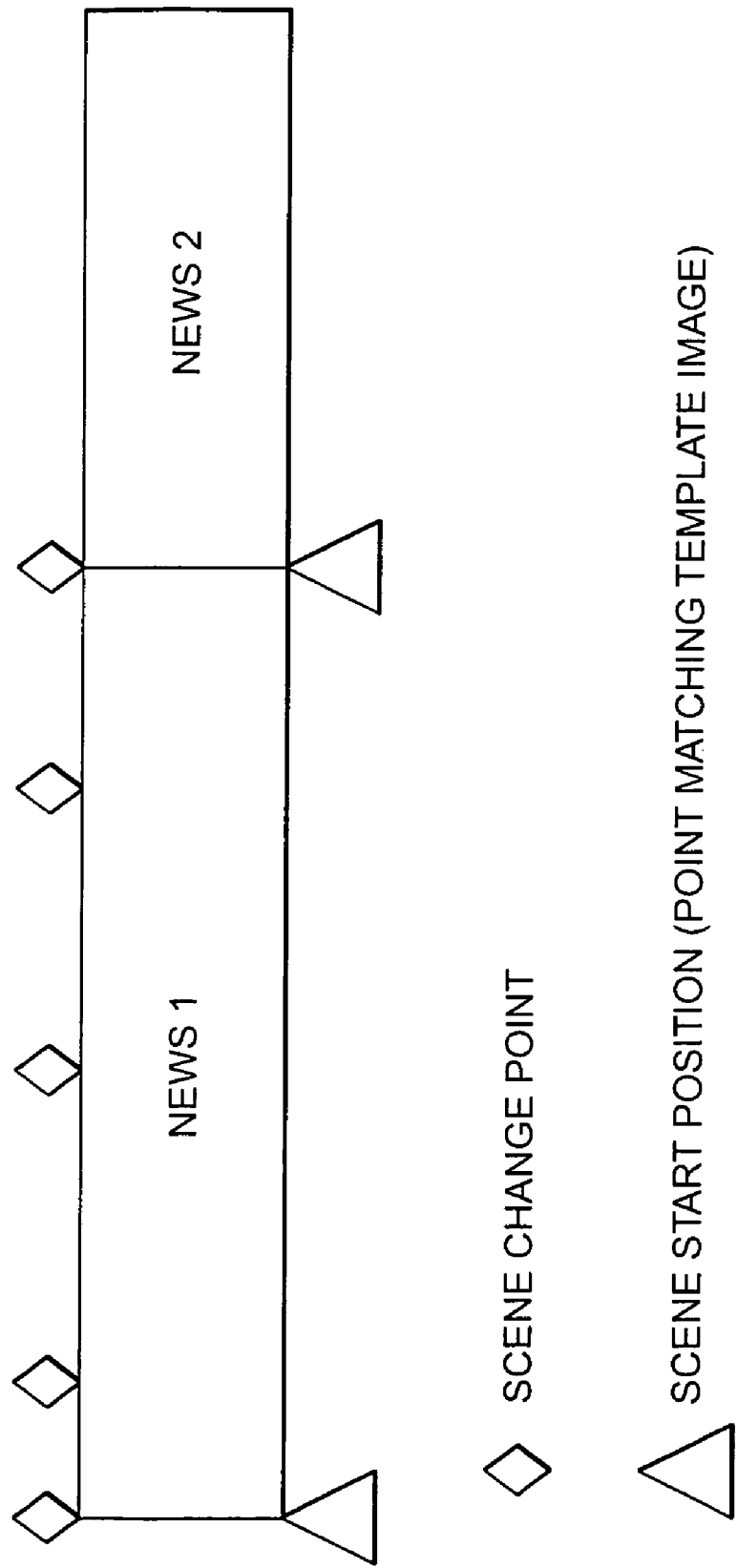
FIG. 7 illustrate show the metadata editing apparatus according to the second embodiment of the present invention operates.

FIG. 7 illustrates how the metadata editing apparatus according to the second embodiment of the present invention operates.

The construction elements other than the scene change detection unit 39 and the scene division unit 3 operate in the same manner as in the first embodiment described above. Therefore, operations unique to the second embodiment will be described below.

The scene change detection unit 39 automatically detects each scene change/cut point. This scene change detection is performed based on a difference in pixel between frames, a difference in color between the frames, a difference in luminance histogram between the frames, or the like, for instance. The scene division unit 3 determines a scene start position and a scene end position based on each scene change point detected by the scene change detection unit 39.

Hereinafter, processing by the scene change detection unit 39 and the scene division unit 3 will be described in detail by taking, as an example, a case where a news video is content that is a target of editing.

A case where a color histogram is used as characteristic amounts for the scene change detection will be described as an example.

The scene change detection unit 39 calculates a color histogram for each frame. As a color system, HSV, RGB, YCbCr, and the like are available, although an HSV color space is used in this example. This HSV color space is composed of three elements called "hue (H)", "saturation (S)", and "value (V)". A histogram of each element is calculated. Next, from the obtained histogram, a difference in histogram between frames is calculated based on Equation 1 given below, for instance. Here, it is assumed that frames from a scene start frame to the Nth frame (N=3, for instance) belong to the same scene, that is, do not contain any scene change point. Note that as the initial characteristic amounts of the scene, a means value (mean) and a standard deviation (sd) of the differences in histogram between the first N frames are obtained based on Equation 2 given below.

$$sum_i = \sum_{k=1}^{bin\_H} |H_i(k) - H_{i-1}(k)| + \sum_{k=1}^{bin\_S} |S_i(k) - S_{i-1}(k)| + \sum_{k=1}^{bin\_V} |V_i(k) - V_{i-1}(k)|.$$

Equation 1

$sum_i$: a sum of differences in histogram between a frame i and a frame i−1

$H_i(h)$: a hue histogram, bin_H: the number of elements of the histogram $S_i(h)$: a saturation histogram, bin_S: the number of elements of the histogram $V_i(h)$: a value histogram, bin_V: the number of elements of the histogram $$mean = \frac{1}{N-1}\sum_{i=1}^{n-1} sum_i, \; sd = \sqrt{\frac{1}{N-1}\sum_{i=1}^{N-1}(sum_i - mean)^2}$$

Equation 2 mean: a means value of the differences in histogram between the frames sd: a standard deviation of the differences in histogram between the frames Then, each frame, from the N+1th and the subsequent frames, that has an inter-frame difference in histogram greater than "means+λ·sd" is regarded as a scene change point and is set as a new scene start position candidate.

In this manner, multiple scene start position candidates are obtained. Next, there will be considered a case where like in the case of a news video, an image having a determined pattern is inserted at switching between news or the like.

In many cases, in a news video, an image having a determined pattern, such as an image composed of an announcer, a studio set on the background, and a character description (caption), is inserted at switching between news, for instance. Accordingly, the image having the predetermined pattern (hereinafter referred to as the "template image") or metadata describing the characteristic amounts of the temperate image is registered in advance. For instance, the characteristic amounts of the template image are the color histogram of the temperate image, the motion pattern (for instance, less motions are observed in the area of an announcer at switching between news), or the like.

When the temperate image is registered in advance, each image corresponding to a scene change point is matched against the template image, as shown in FIG. 7. Then, if the similarity therebetween is high, the scene change point is registered as a scene start position. The similarity may be judged based on inter-frame differences, inter-frame differences in color histogram, or the like.

Also, when the characteristic amounts of the template image are registered in advance, characteristic amounts of each image corresponding to a scene change point are extracted and are matched against the characteristic amounts of the temperate image. If the similarity therebetween is high, the scene change point is registered as a scene start position. Then, information showing the scene start position is outputted to the scene division unit 3.

The scene division unit 3 determines a scene start position and a scene end position based on the information showing the scene start position automatically detected by the scene change detection unit 39. Note that the scene division unit 3 of the second embodiment is also capable of determining the scene start position and the scene end position based on designation from the user, like in the first embodiment described above.

It is also possible for the scene change detection unit 39 to detect each scene change point contained in a scene with reference to each scene start position and each scene end portion described in the scene section information metadata 12 outputted from the scene division unit 3 to the scene change detection unit 39.

The scene description edit unit 5 re-divides or integrates the scenes automatically detected by the scene change detection unit 39 based on the scene section information metadata 12 from the scene division unit 3. Note that the details of the scene description edit unit 5 are the same as those in the first embodiment described above.

As described above, with the metadata editing apparatus 100A according to the second embodiment, it becomes possible to generate metadata describing the hierarchical structure possessed by content, such as video data, and characteristic amounts of each scene, like in the first embodiment described above. In addition, the scene change detection unit 39 is provided, so that it becomes possible to automatically detect each scene change point in content.

Third Embodiment

In this third embodiment, a metadata reproduction apparatus will be described which performs summary reproduction of images, searching, and the like using the metadata generated by the metadata editing apparatus according to the first embodiment or the second embodiment described above.

Figure 8:
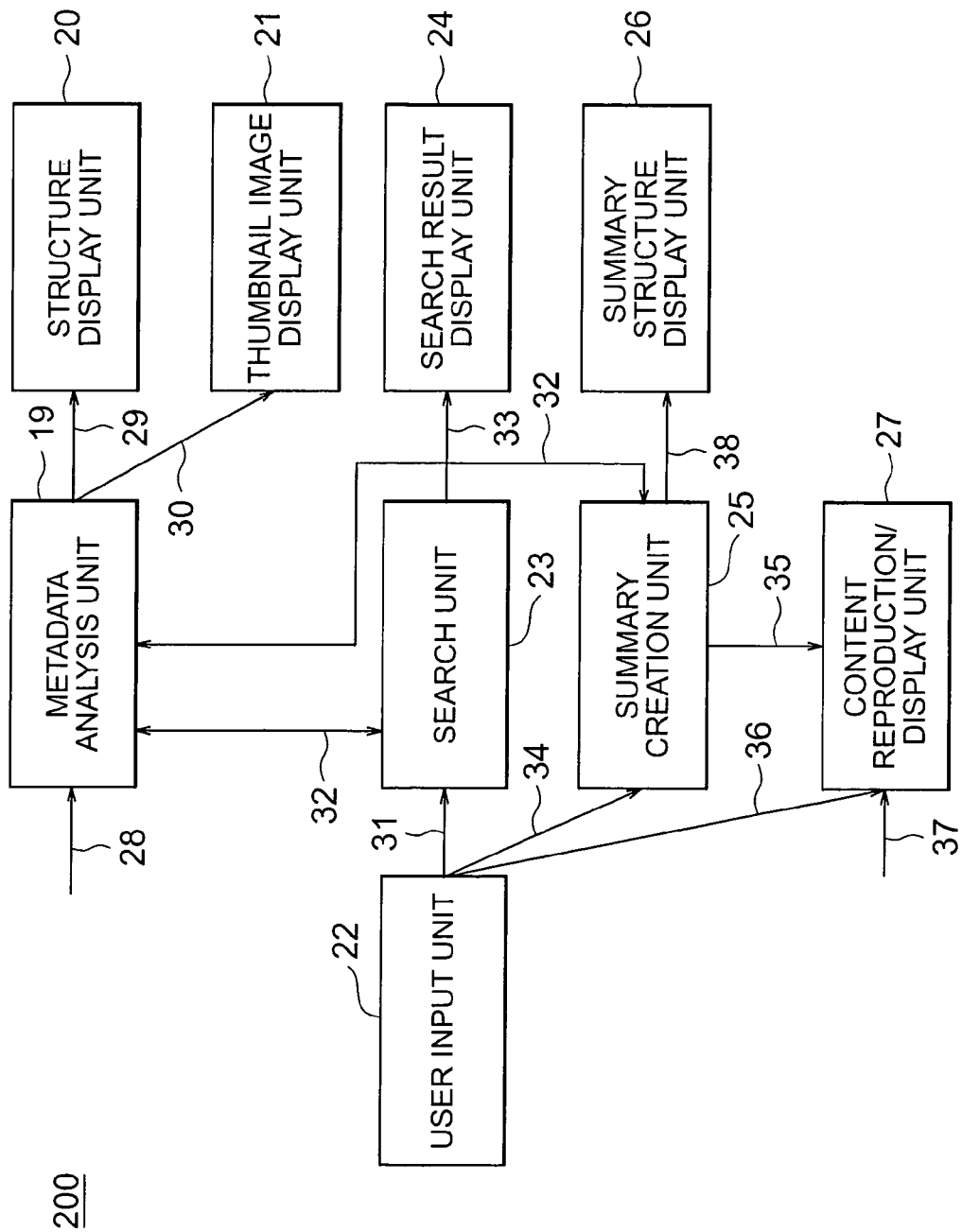
FIG. 8 is a block diagram showing a construction of a metadata reproduction apparatus according to a third embodiment of the present invention.

The metadata reproduction apparatus according to the third embodiment of the present invention will be described with reference to the accompanying drawings. FIG. 8 is a block diagram showing a construction of the metadata reproduction apparatus according to the third embodiment of the present invention.

Referring to FIG. 8, a metadata reproduction apparatus 200 includes a metadata analysis unit 19, a structure display unit 20, a thumbnail image display unit 21, an user input unit 22, a search unit 23, a search result display unit 24, a summary creation unit 25, a summary structure display unit 26, and a content reproduction unit 27.

The metadata analysis unit 19 performs analysis of metadata 28 describing the hierarchical scene structure possessed by content, information concerning the thumbnail of each scene, the characteristic amounts of each scene, and the like. The structure display unit 20 displays a scene structure 29 obtained as a result of the metadata analysis, that is, the hierarchical structure of the content. The thumbnail image display unit 21 displays thumbnail image information 30 obtained as a result of the metadata analysis.

With the user input unit 22, a user inputs search designation, reproduction designation, and the like. The search unit 23 performs searching based on the search designation (search condition 31) from the user and the scene characteristic amounts or text information 32 obtained from the metadata. The search result display unit 24 displays a result 33 of the searching. The summary creation unit 25 performs creation of a summary based on summary creation designation (summary creation condition 34) from the user. The summary structure display unit 26 displays a structure 38 of summarized content. The content reproduction unit 27 reproduces/displays the content based on summary information 35, content reproduction designation 36, and content 37 to be reproduced.

Next, how the metadata reproduction apparatus according to the third embodiment operates will be described with reference to the accompanying drawings.

First, the metadata analysis unit 19 receives input of the metadata 28 describing the hierarchical scene structure possessed by the content, information concerning the thumbnail of each scene, the characteristic amounts of each scene, and the like, and performs analysis of the metadata.

In the third embodiment, it is assumed that the metadata 28 is metadata generated by the metadata description unit 9 of the first embodiment or the second embodiment described above in a format stipulated by MPEG-7. Consequently, the metadata is a text file written in XML or a binary file encoded in the binary format.

If the metadata 28 is written in XML, the metadata analysis unit 19 serves as an XML parser that performs analysis of an XML file. On the other hand, if the metadata 28 is encoded in the binary format, the metadata analysis unit 19 serves as a decoder that performs decoding of the metadata 28.

The structure display unit 20 receives input of a result of the analysis by the metadata analysis unit 19 and displays the hierarchical scene structure 29 of the content. The scene structure of the content is displayed in a tree form together with the title of each scene, as shown in FIG. 4.

The thumbnail image display unit 21 receives input of the result of the analysis by the metadata analysis unit 19 (thumbnail image information 30) and displays a list of thumbnail images of the content.

The search unit 23 receives search designation from the user via the user input unit 22 and searches for a scene contained in the content. At this time, the user inputs a search condition by giving a keyword, a sample image, or the like via the user input unit 22. The search unit 23 searches for each scene matching the search condition 31, such as the keyword or the characteristics of the sample image, given by the user based on the scene characteristic amounts described in the metadata or the text information 32 giving scene titles and the like.

When the searching by the search unit 23 is finished, the search result display unit 24 receives input of the result 33 of the searching by the search unit 23 and performs displaying of the search result. As a method for displaying the search result, the thumbnail image of each scene matching the search condition is displayed, for instance.

Also, the summary creation unit 25 creates a summary of the content based on summary creation designation from the user via the user input unit 22. At this time, the user inputs information showing the reproduction time of summarized content, user preferences, and the like using the user input unit 22. When the content is a news video, for instance, the user inputs preference information showing that, for instance, he/she wishes to mainly watch sports news in the news video or to watch a 20-minute summary of the news video whose original length is one hour. The summary creation unit 25 also creates the summary information 35 matching the summary condition based on the scene reproduction times described in the metadata and the text information 32 giving the scene titles and the like. For instance, this summary information 35 is a reproduction list of scenes contained in the summarized content and is a list in which the location information, such as the URL, of the content is written together with the start position and end position of each scene in the content that the user wishes to reproduce.

Also, the content reproduction/display unit 27 specifies target content based on the location information of the content contained in the summary information 35, and performs obtainment/reproduction/display of each scene to be reproduced based on the scene list contained in the summary information. In another form, the summary information hierarchically describes the scene structure of the summarized content.

Figure 9:
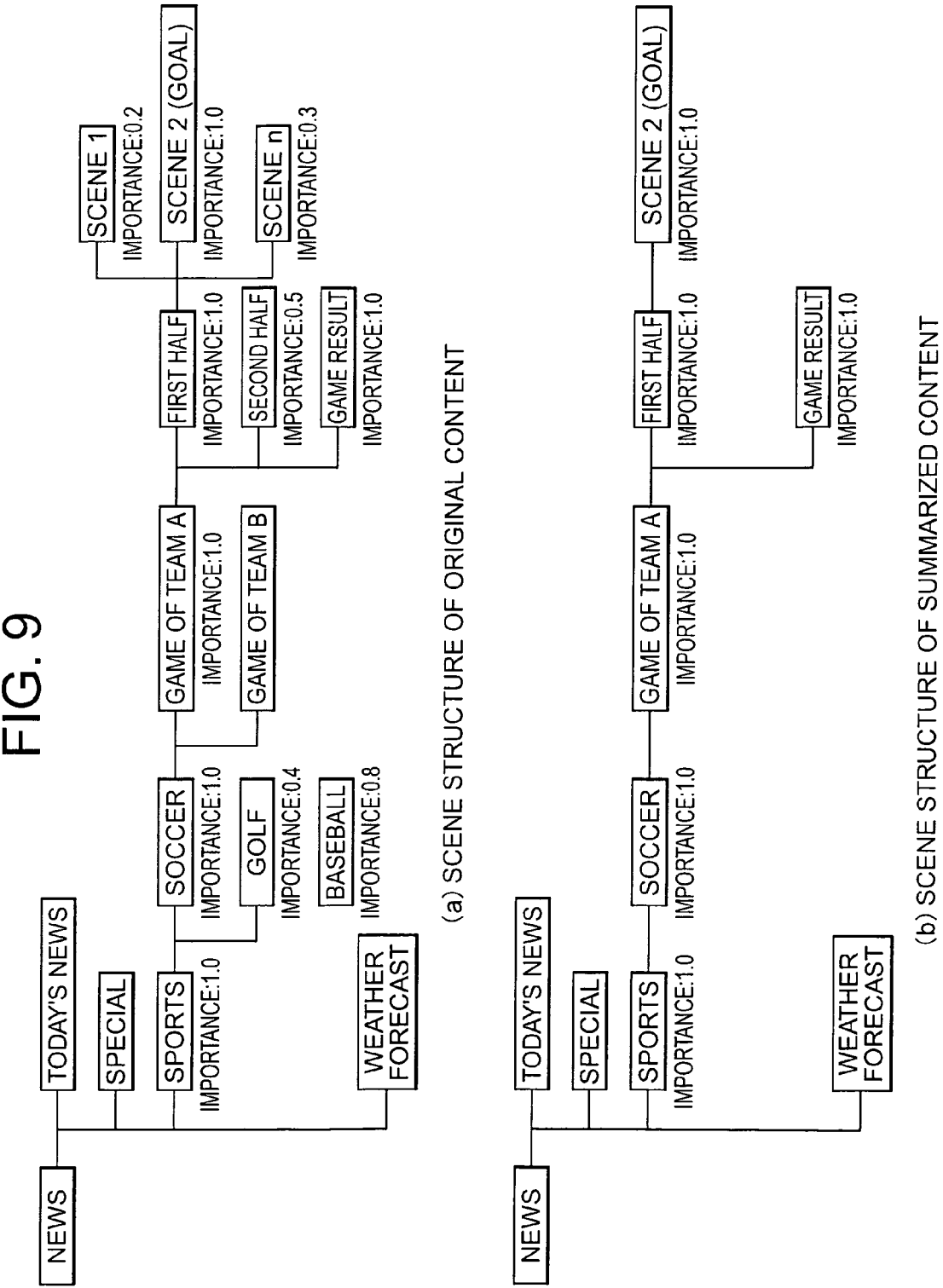
FIG. 9 illustrates how the metadata reproduction apparatus according to the third embodiment of the present invention operates.

FIG. 9 shows an example of a hierarchical scene structure. FIG. 9(a) shows an example of a scene structure of original content. Each scene is given importance in a range of 0.0 to 1.0, with "1.0" meaning the highest importance and "0.0" meaning the lowest importance. The importance is calculated based on the user preferences, for instance. If the user preferences are registered in advance and indicate that he/she wishes to watch scenes of a soccer game of a team A and, in particular, to necessarily watch a result of the game and goal scenes, each scene is given importance reflecting the user preferences.

Following this, when summarization is performed using only scenes having the highest importance in FIG. 9(a), there is generated summarized content having the scene structure shown in FIG. 9(b). Note that each scene has metadata showing the location information, such as the URL, of the content containing the scene, the position information (the start position and the end position) of the scene in the content, and the like. Information concerning the scene structure 38 of the summarized content is passed to the summary structure display unit 26, which then displays the scene structure 38 in the tree form shown in FIG. 9(b).

Also, when the user selects at least one scene that he/she wishes to reproduce using the scene structure displayed by the structure display unit 20 or the summary structure display unit 26 or using the scene thumbnails displayed by the thumbnail image display unit 21 or the search result display unit 24 via the user input unit 22, the content reproduction/display unit 27 reproduces/displays each selected scene contained in the content.

As described above, with the metadata reproduction apparatus 200 according to the third embodiment, it becomes possible to reproduce only each scene that the user wishes to watch using the metadata generated by the metadata editing apparatus according to the first embodiment or the second embodiment described above or to search for the scene desired by the user using the characteristic amounts described in the metadata.

In the third embodiment, the content reproduction/display unit 27 is provided within the metadata reproduction apparatus 200. However, this content reproduction/display unit may be provided in anther apparatus. For instance, manipulations and displaying concerning reproduction of the metadata, such as displaying of the scene structure and the thumbnail images, may be performed by a mobile telephone, a portable information terminal, or the like, and processing and displaying concerning reproduction of the multimedia content may be performed by a terminal (PC, for instance) connected to the mobile telephone, the portable information terminal, or the like via a network.

Fourth Embodiment

In this fourth embodiment, a metadata delivery server (metadata delivery apparatus), which delivers the metadata of content to a client terminal, and a content delivery server, which scalably constructs the content with reference to the terminal capability of the client terminal and delivers the constructed content to the client terminal, will be described.

Figure 10:
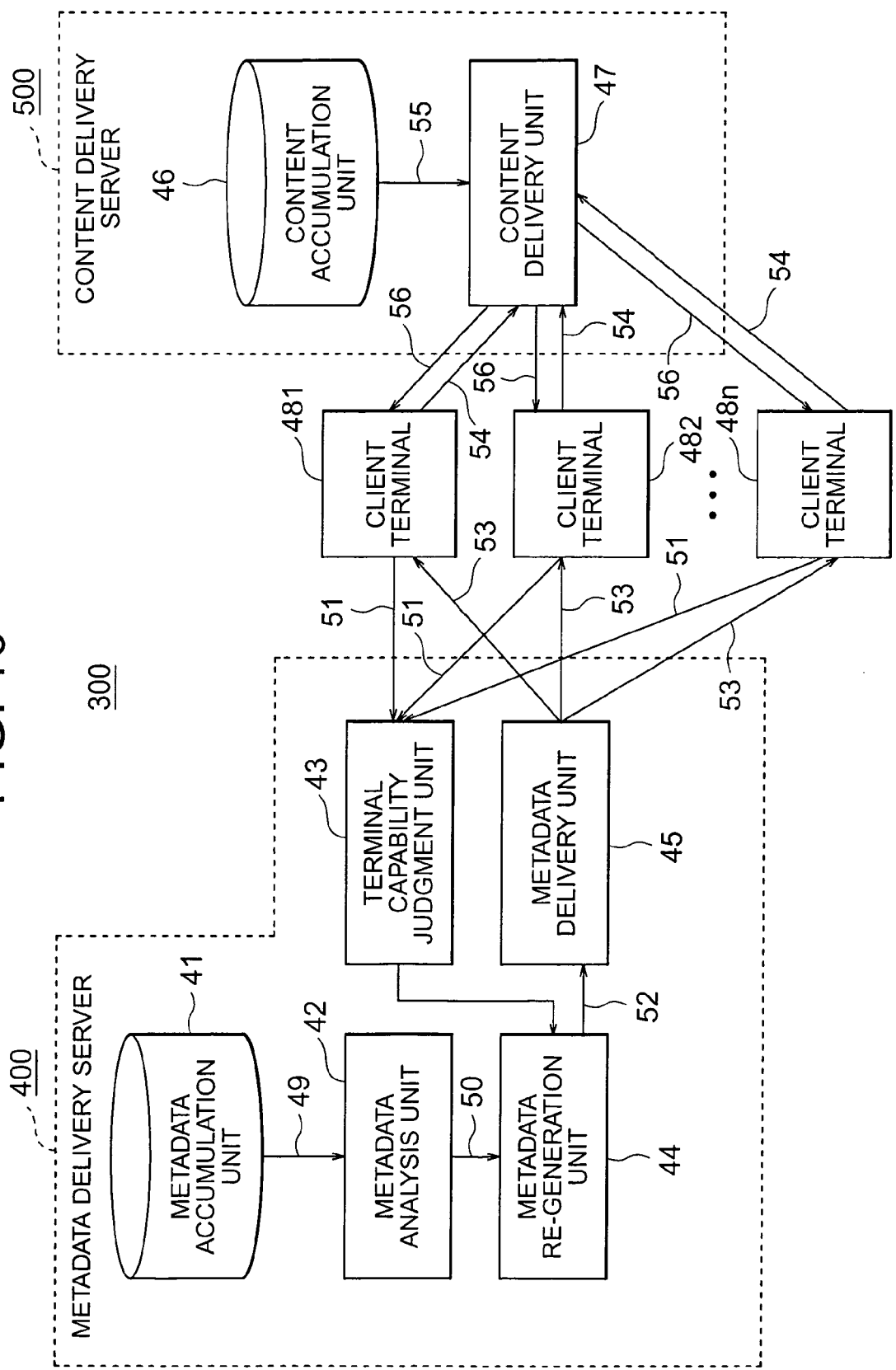
FIG. 10 is a block diagram showing a construction of a content delivery system according to a fourth embodiment of the present invention.

A content delivery system according to the fourth embodiment of the present invention will be described with reference to the accompanying drawings. FIG. 10 is a block diagram showing a construction of the content delivery system according to the fourth embodiment of the present invention.

Referring to FIG. 10, a content delivery server 300 includes a metadata delivery server 400, various client terminals 481 to 48n, and a content delivery server 50.

The metadata delivery server 400 includes a metadata accumulation unit 41, a metadata analysis unit 42, a terminal capability judgment unit 43, a metadata re-generation unit 44, and a metadata delivery unit 45.

In the metadata accumulation unit 41, there is accumulated the metadata generated by the metadata editing apparatus of the first embodiment or the second embodiment described above, for instance. The metadata analysis unit 42 performs analysis of metadata 49 describing the structure and characteristics of content. The terminal capability judgment unit 43 judges the terminal capability of each client terminal based on information 51 concerning the capability of the client terminal. The metadata re-generation unit 44 restructures the content in accordance with the judged terminal capability of the client terminal based on a result 50 of the analysis of the metadata, and re-generates metadata 52 of the restructured content. The metadata delivery unit 45 delivers metadata 53 re-generated by the metadata re-generation unit 44 to the client terminals 481 to 48n.

Note that the metadata accumulation unit 41 may be provided outside the metadata delivery server 400 of the fourth embodiment. In this case, the metadata delivery server 400 receives input of the metadata 49 from the metadata accumulation unit 41 via a network (not shown) or the like.

On the other hand, the content delivery server 500 includes a content accumulation unit 46 and a content delivery unit 47.

In the content accumulation unit 46, there is accumulated content 55. The content delivery unit 47 delivers content 56 to the client terminals 481 to 48n in accordance with content delivery requests 54 from the client terminals.

Like in the case of the metadata delivery server 400 described above, the content accumulation unit 46 may be provided outside the content delivery server 500. In this case, the content delivery server 500 receives input of the content data 55 via a network (not shown).

Next, how the content delivery system according to the fourth embodiment operates will be described with reference to the accompanying drawings.

First, on the metadata delivery server 400 side, the metadata analysis unit 42 performs analysis of the metadata accumulated in the metadata accumulation unit 41. The metadata analysis unit 42 operates in the same manner as the metadata analysis unit 19 of the metadata reproduction apparatus 200 of the third embodiment described above. By performing the analysis of the metadata, the metadata analysis unit 42 obtains information concerning the structure and characteristics of the content.

Figure 11:
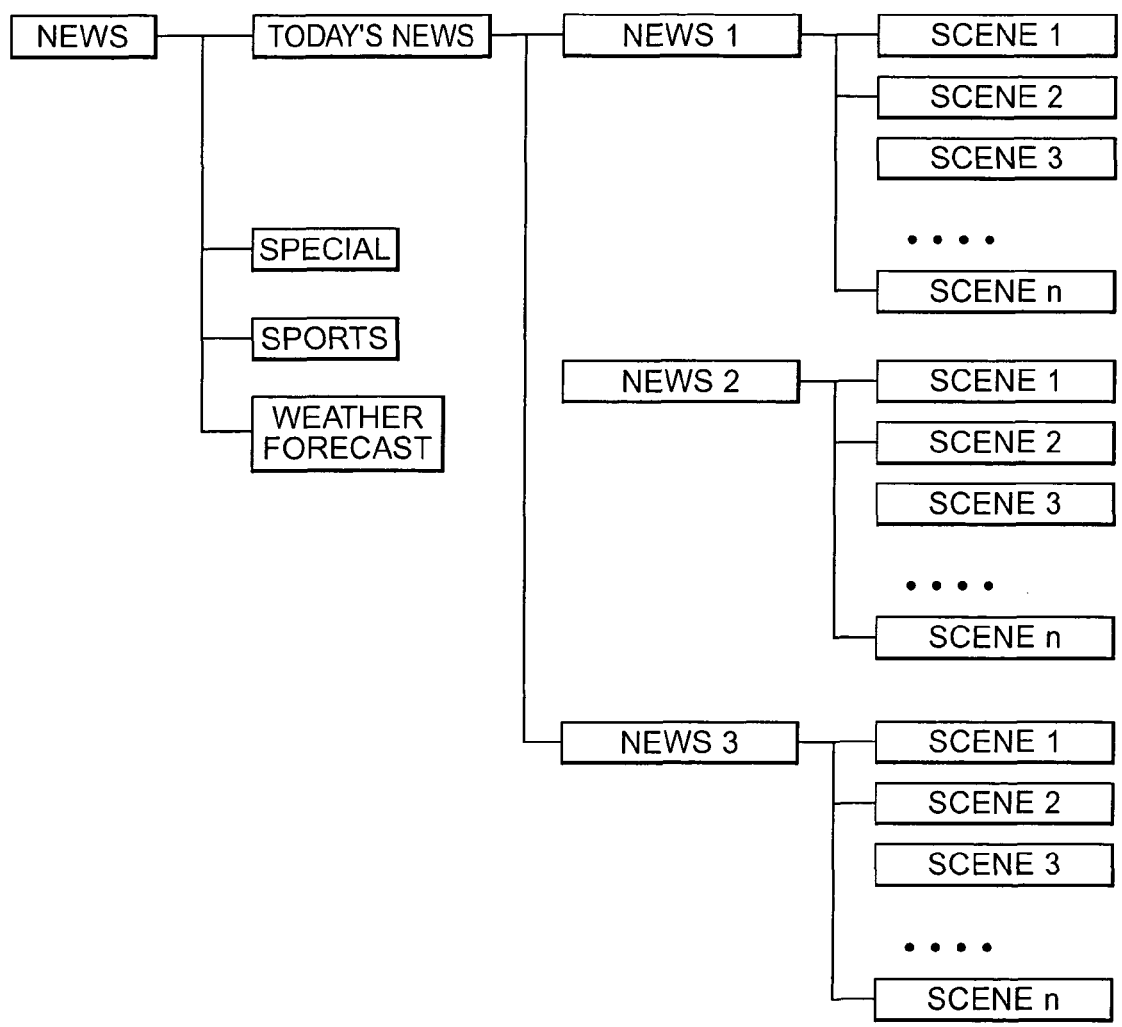
FIG. 11 shows content (in this case, a news video) structure information outputted from a metadata analysis unit of a metadata delivery server according to the fourth embodiment of the present invention.

FIG. 11 shows content structure information outputted from the metadata analysis unit of the metadata delivery server according to the fourth embodiment, with the illustrated example relating to a news video. In FIG. 11, the hierarchical scene structure of the content is displayed in a tree form. Each node of the tree corresponds to one scene and is associated with various types of scene information. Here, the various types of scene information include a scene title, an abstract, time information giving a scene start position and a scene end position, a scene thumbnail, a representative frame, a thumbnail shot, a representative shot, and scene characteristics such as visual characteristic amounts concerning colors, motions, and the like. Note that in FIG. 11, among the various types of scene information, only the scene titles are shown.

Here, it is assumed that the client terminals are various information household devices having different terminal capabilities. The terminal capability refers to a communication speed, a processing speed, an image format that can be reproduced/displayed, an image resolution, a user input function, and the like. For instance, it is assumed that the client terminal 481 is a personal computer (PC) that has sufficient performance with respect to the communication speed, processing speed, display performance, and user input function. Also, it is assumed that the client terminal 482 is a mobile telephone and the remaining client terminals are each a PDA or the like. Each of the client terminals 481 to 48n sends information concerning its terminal performance.

The terminal capability judgment unit 43 analyzes the information 51 that was sent from each of the client terminals 481 to 48n and shows the terminal performance of the client terminal, determines a deliverable image format, a maximum image resolution, a length of the content, and the like, and outputs them to the metadata re-generation unit 44. When the original content is video content encoded in MPEG-2 and has a high-resolution, for instance, the original content can be reproduced by the client terminal 481 as it is because the client terminal 481 has sufficient performance as described above. Also, it is assumed that this client terminal 481 has a function with which it is possible to perform the image summary reproduction and searching described in the third embodiment described above. On the other hand, it is assumed that the client terminal 482 is capable of reproducing only short video shots encoded in MPEG-4 and the maximum resolution displayable by the client terminal 482 is low.

The metadata re-generation unit 44 restructures the content in accordance with the terminal performance of each of the client terminals 481 to 48n informed by the terminal performance judgment unit 43, re-generates the metadata 52 describing the structure and contents of the restructured content, and outputs the metadata 52 to the metadata delivery unit 45. For instance, the original metadata is delivered to the client terminal 481 as it is, so that the restructuring of the content is not performed. On the other hand, the client terminal 482 has only the function of reproducing short video shots and is incapable of reproducing every scene, so that the restructuring of the content is performed for the client terminal 482 using short video shots of important scenes.

Figure 12:
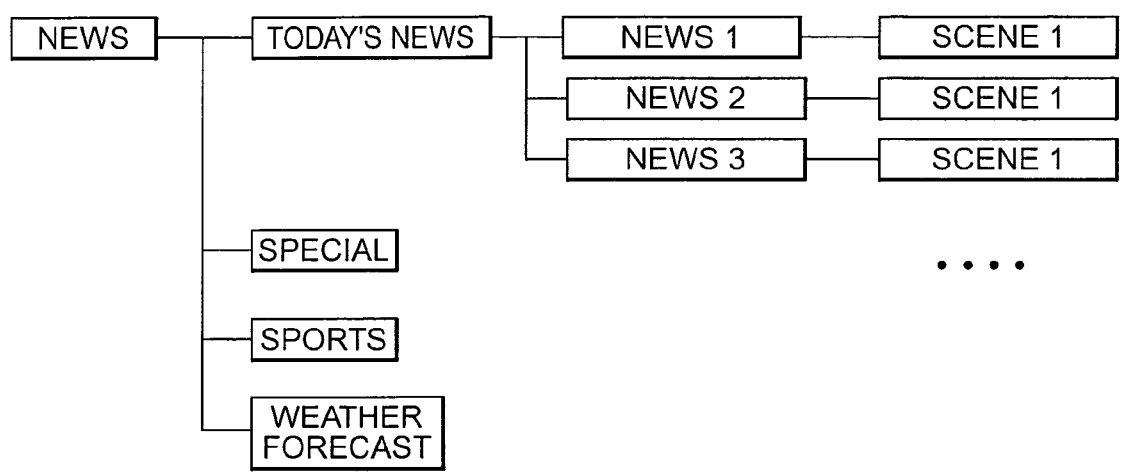
FIG. 12 shows an example of a structure of content after restructuring by a metadata re-generation unit of the content delivery system according to the fourth embodiment of the present invention.

FIG. 12 shows an example of a content structure after the restructuring by the metadata re-generation unit of the content delivery system according to the fourth embodiment. As shown in FIG. 12, each important scene, out of scenes of the news video, is extracted and the content is restructured so as to include only the representative shot or representative frame of each extracted scene. Also, the client terminal 482 does not have the search function described in the above third embodiment, so that among the various types of scene information in the metadata, the scene characteristic amounts are not required to be included for searching. Therefore, the metadata re-generation unit 44 re-generates metadata describing only the structure of restructured scenes and the position information of the representative shots or representative frames of the scenes, and sends the metadata to the metadata delivery unit 45.

The metadata delivery unit 45 delivers the metadata 53 generated by the metadata re-generation unit 44 to the client terminals 481 to 48n.

Each of the client terminals 481 to 48n analyzes the metadata 53 delivered by the metadata delivery unit 45 and obtains scene structure information of the content. When a user of each of the client terminals 481 to 48n selects a scene that he/she wishes to reproduce, the client terminal transmits position information of the selected scene to the content delivery unit 47 of the content delivery server 500.

On receiving the scene position information from each of the client terminals 481 to 48n, the content delivery unit 47 of the content delivery server 500 obtains corresponding content 55 from the content accumulation unit 46 and delivers the content to each of the client terminals 481 to 48n. In the case of the client terminal 481, the content delivery unit 47 sends a scene start position and a scene end position and delivers a corresponding scene of the original content. On the other hand, in the case of the client terminal 482, the content delivery unit 47 sends the location information (such as the URL) of a scene representative shot. Note that when the representative shot is not reproducible/displayable by the client terminal 482 because of its image format, image resolution, image file size, or the like, the content delivery unit 47 performs various kinds of processing, such as format conversion, resolution conversion, and reduction in file size through content summarization, and sends resultant data to the client terminal 482.

As described above, with the metadata delivery server 400 of the fourth embodiment, it becomes possible to re-generate metadata in accordance with the capability of each of the client terminals 481 to 48n and to deliver the re-generated metadata to each of the client terminals 481 to 48n.

It should be noted here that in FIG. 10, the metadata delivery server 400 and the content delivery server 500 are shown as separated apparatuses, but the present invention is not limited to this. For instance, the content delivery server may be provided in the metadata delivery server or the metadata delivery server may be provided in the content delivery server. In addition, needless to say, the metadata delivery server and the content delivery server may be provided in the same server. In this case, it becomes possible for the terminal capability judgment unit 43 to easily inform the content delivery unit 47 of the capability of each of the client terminals 481 to 48n, which makes it possible to restructure the content through format conversion or the like in accordance with the capability of the client terminal and to deliver the restructured content to each of the client terminals 481 to 48n.

Also, the fourth embodiment has been described by assuming that in the metadata accumulation unit 41, the metadata generated by the metadata editing apparatus of the first embodiment or the second embodiment described above is accumulated. However, the present invention is not limited to this and, needless to say, metadata generated by an apparatus other than the metadata editing apparatus of the first embodiment or the second embodiment described above may be accumulated in the metadata accumulation unit 41.

Fifth Embodiment

In this fifth embodiment, another example of the metadata delivery server described in the above fourth embodiment will be described. The metadata delivery server of the above fourth embodiment performs the metadata re-generation based on the terminal information sent from each client terminal. In the fifth embodiment, however, in order to more appropriately perform the metadata re-generation, the metadata delivery server (metadata delivery apparatus) is provided with a metadata analysis/re-generation unit that performs the metadata re-generation using metadata optimization hint information that is hint information for the metadata re-generation.

Figure 13:
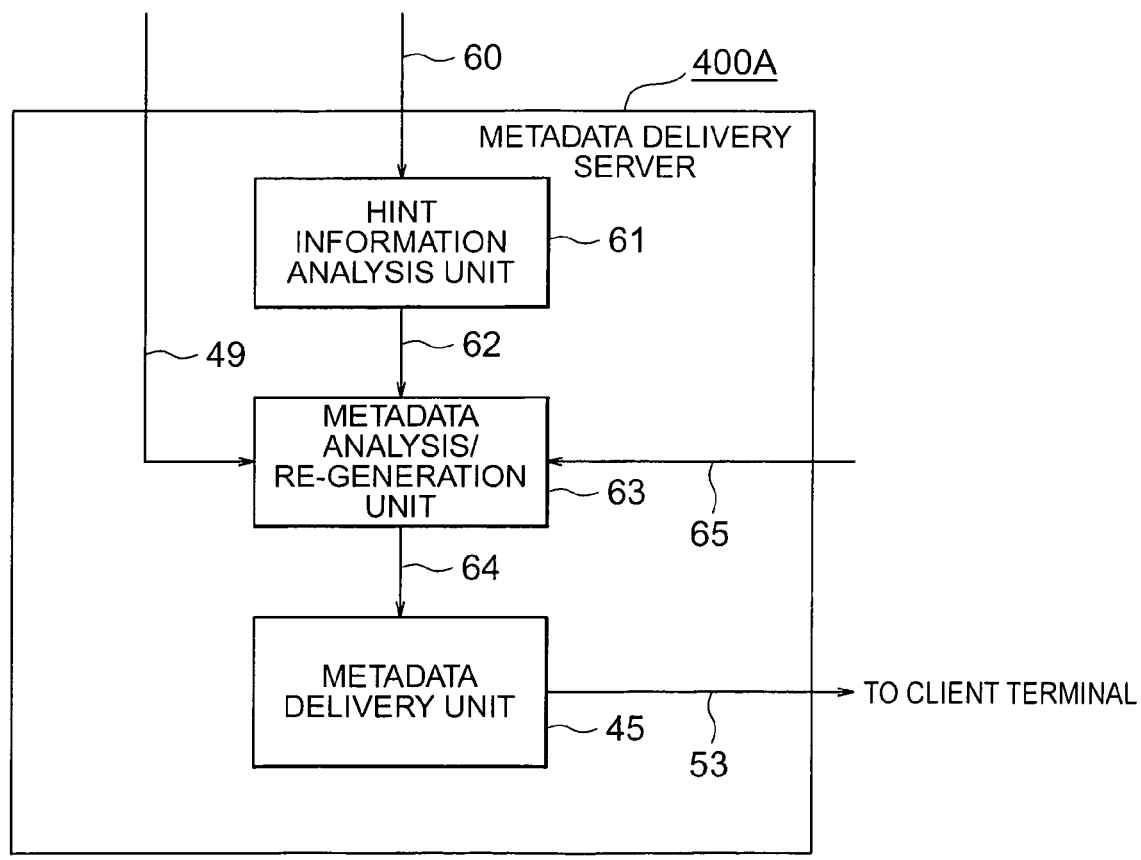
FIG. 13 is a block diagram showing a construction of a metadata delivery server according to a fifth embodiment of the present invention.

The metadata delivery server according to the fifth embodiment of the present invention will be described with reference to the accompanying drawings. FIG. 13 is a block diagram showing a construction of the metadata delivery server according to the fifth embodiment of the present invention.

Referring to FIG. 13, a metadata delivery server 400A includes a hint information analysis unit 61, metadata analysis/re-generation unit 63, and a metadata delivery unit 45.

The hint information analysis unit 61 analyzes metadata optimization hint information 60 and outputs a result of the analysis. The metadata analysis/re-generation unit 63 analyzes metadata 49 describing the structure and characteristics of content based on analyzed metadata optimization hint information 62 and a condition 65 concerning metadata re-generation such as information concerning the performances of the client terminals or user preferences, and outputs restructured metadata 64. Then, the metadata delivery unit 45 delivers metadata 53 to the client terminals.

In the metadata accumulation unit 41 (see FIG. 10), the metadata 49 describing the structure and characteristics of the content and the metadata optimization hint information 60 that is hint information for the re-generation of the metadata 49 are accumulated. Here, the metadata optimization hint information 60 for the re-generation of the metadata 49 is information describing the types of information contained in the metadata 49, the amount of the contained information, and the outline and complexity of the metadata 49.

Next, how the metadata delivery server according to the fifth embodiment operates will be described with reference to the accompanying drawings.

Figure 14:
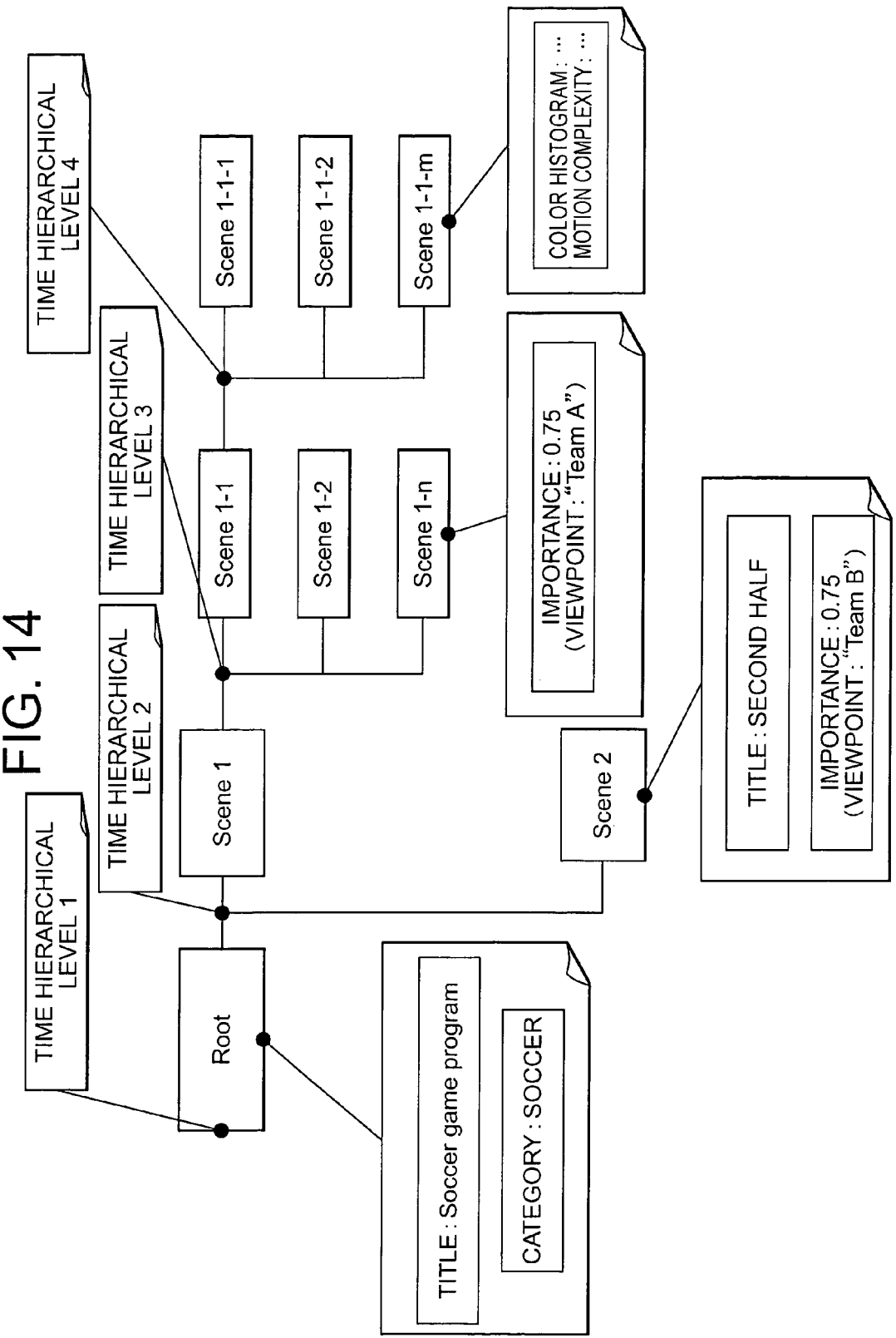
FIG. 14 shows an example of video content, with reference to which processing of metadata optimization hint information by the metadata delivery server according to the fifth embodiment of the present invention is described.

The metadata optimization hint information 60 will be described in detail by taking, as an example, a case of video content having the structure shown in FIG. 14.

A video content (Root) (Soccer game program) is broadly divided into two scenes (Scene 1 and Scene2) corresponding to the first half and the second half, and the first half scene is further divided into multiple scenes (Scene1-1, Scene1-2, . . . , Scene1-n) (such as goal scenes and corner kick scenes). In FIG. 14, the temporal hierarchical structure among the scenes is indicated using a tree structure.

The metadata 49 corresponding to the video content describes the temporal hierarchical structure of the content, that is, the temporal relations among the scenes, and the start times and lengths of the scenes. The metadata 49 also describes text information (such as a title, abstract, category, and explanatory notes), importance, and the like of each scene as well as the characteristics (for instance, a color histogram or motion complexity) possessed by the scene in accordance with the hierarchical level of the scene. Note that in this fifth embodiment, it is assumed that MPEG-7 standardized by ISO is used as a metadata description format.

Figure 15:
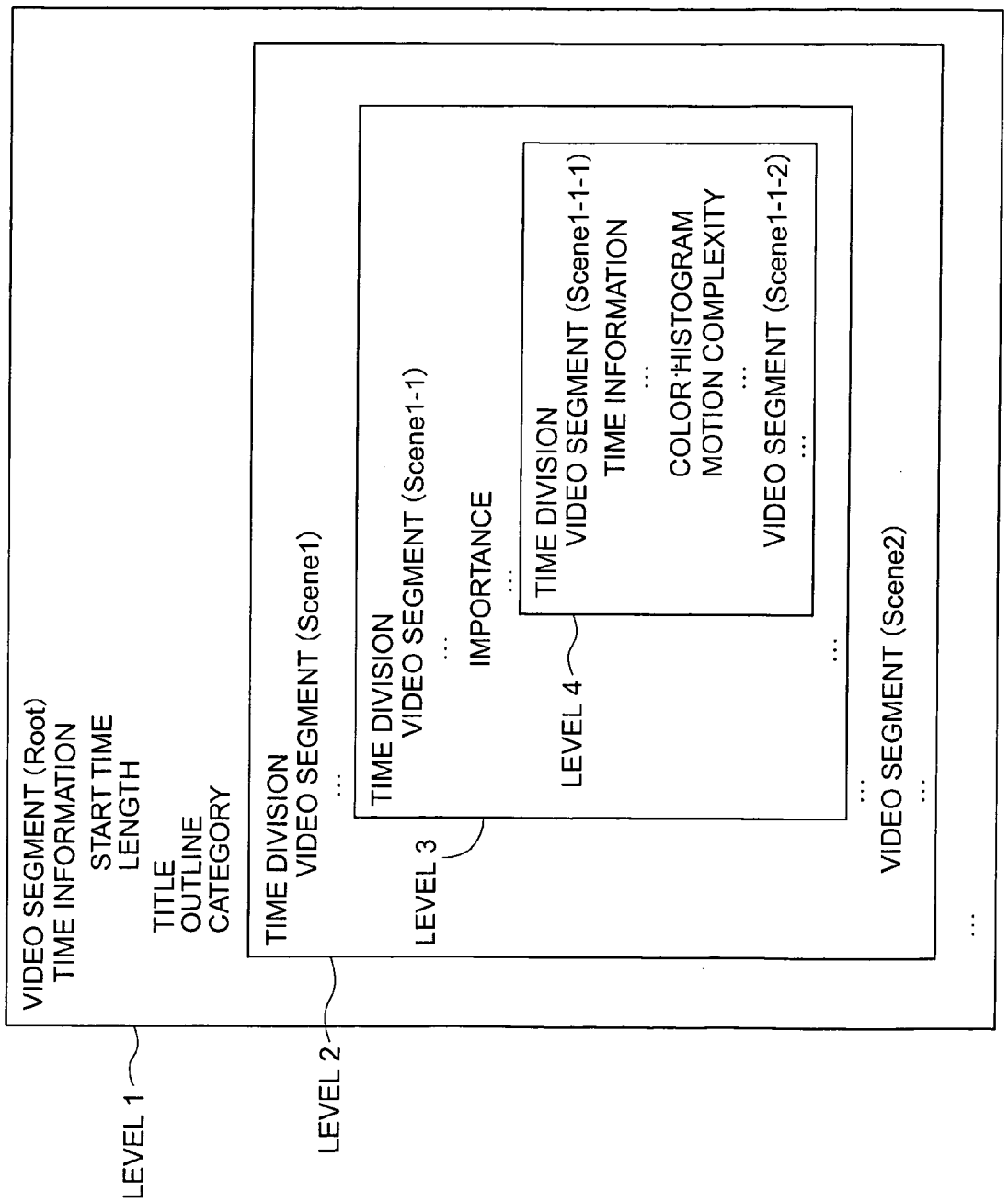
FIG. 15 shows how metadata is described in MPEG-7 by the metadata delivery server according to the fifth embodiment of the present invention.

FIG. 15 shows how the metadata is described in MPEG-7. In MPEG-7, each scene is described in units called "video segment". In each video segment, there are described time information (scene start point and length), a title, an outline, a category, and the like. Note that there is a case where the information described in each video segment is changed in accordance with the hierarchical level of the video segment. In the example shown in FIG. 15, importance is described in each video segment at Level 2 and Level 3, although no importance is described in each video segment at Level 4. Also, the characteristic amounts concerning colors and motions are described only in each video segment at Level 4.

It is possible to express the temporal hierarchical relations among the scenes by recursively describing the video segments. In the description example shown in FIG. 15, with a "time division" description, there is described a state where one video segment is composed of multiple video segments temporally divided. In MPEG-7, it is also possible to describe the spatial hierarchical structure possessed by the content in a like manner. In this case, instead of the "time division" description, a "space division" description is used to express a state where one segment is composed of multiple segments spatially divided.

The metadata optimization hint information 60 for the re-generation of the metadata 49 describes the types and contents of information (descriptors) contained in the metadata 49. Accordingly, in the case of the metadata shown in FIG. 15, the metadata optimization hint information 60 contains a descriptor ("time division") expressing the temporal hieratical structure possessed by the content, descriptors expressing the color histogram and the motion complexity, and descriptors expressing the title, abstract, category, and importance. Also, in order to express description contents and complexity, the depth of each video segment in the hierarchical structure is expressed with up to four levels (Level 1 to Level 4). Further, the importance assumes one of five discrete values ({0.0, 0.25, 0.5, 0.75, 1.0}). As importance with respect to viewpoints, there are described importance from the viewpoint of "Team A" and importance from the viewpoint of "Team B". Also, there is described the hierarchical position at which the importance is described (video segment level at which the importance is described).

FIG. 16 shows an example of a format of the metadata optimization hint information 60. The metadata optimization hint information 60 shown in FIG. 16 contains metadata file information and metadata construction element information.

The metadata file information describes information for predicting resources required to process the metadata, such as the memory size required to accumulate/analyze the metadata and the processing system (S/W) required to analyze the metadata. In more detail, for instance, the metadata file information describes the location of a metadata file, the size of the metadata file, the format of the metadata file (for instance, the XML format or the binary format), syntax file information (location of a syntax file defining the syntax of the metadata), and an appearing element number showing the number of elements contained (appearing) in the metadata. Note that when the metadata is described in the XML format, the syntax file defining the format of the metadata file corresponds to a DTD file, a schema file, or the like defining the description format (syntax) of the metadata, and the syntax file information describes the location of the DTD file or the schema file, for instance.

The metadata construction element information is information describing the type and contents of each descriptor constituting the metadata. In more detail, the metadata construction element information contains the name of each descriptor contained in the metadata, the appearing frequency (number of appearing times) of the descriptor in the metadata, and a description (completeness of description) showing whether or not the descriptor contains every descriptor that has the possibility of being syntaxically contained. In addition, when the descriptor is recursively described, the metadata construction element information also contains the temporal or spatial hierarchical property (maximum value of the depth) possessed by the descriptor. In the case of the metadata description shown in FIG. 15, for instance, "video segment" is the descriptor recursively described and has a hierarchical structure with up to four levels, so that the maximum hierarchical depth possessed by the "video segment" descriptor becomes four.

In addition, as to a descriptor contained the descriptor recursively described, the hint information also describes the appearing position (hierarchical level) at which the contained descriptor appears. For instance, "importance" is a descriptor contained in the "video segment" descriptor and, when the "importance" is contained in the video segment at up to Level 3, that is, is not contained in the video segment at Level 4, the appearing position of the "importance" becomes up to Level 3. In this manner, the appearing position is specified using the hierarchical level. However, when an ID is assigned to each "video segment" containing the "importance" or the "video segment" itself, it is also possible to describe the appearing position as an ID list. Also, in the case of a descriptor having a value, the hint information additionally describes the type of the descriptor and the range of values that the descriptor is assumable to have. When the importance is expressed using the five discrete values ({0.0, 0.25, 0.5, 0.75, 1.0}) with respect to each of the viewpoints of "Team A" and "Team B", for instance, the assumable values of the "importance" become a list of {0.0, 0.25, 0.5, 0.75, 1.0} having a floating-point form. The above description is repeated for each descriptor that is a construction element of the metadata.

FIG. 17 shows an example of the metadata optimization hint information described in accordance with the format shown in FIG. 16. It can be seen that the example of the metadata optimization hint information 60 shown in FIG. 17 contains the metadata file information and the metadata construction element information for descriptors such as the "video segment" descriptor and the "title" descriptor.

Next, a method for performing re-generation of metadata using the metadata optimization hint information 60 will be described with reference to FIG. 13.

The hint information analysis unit 61 performs analysis of the metadata optimization hint information 60 described in the specified format. The metadata analysis/re-generation unit 63 performs analysis of the metadata 49 using the analyzed metadata optimization hint information 62 outputted from the hint information analysis unit 61, and outputs the metadata 64 re-generated based on the condition 65 concerning the metadata re-generation.

Figure 18:
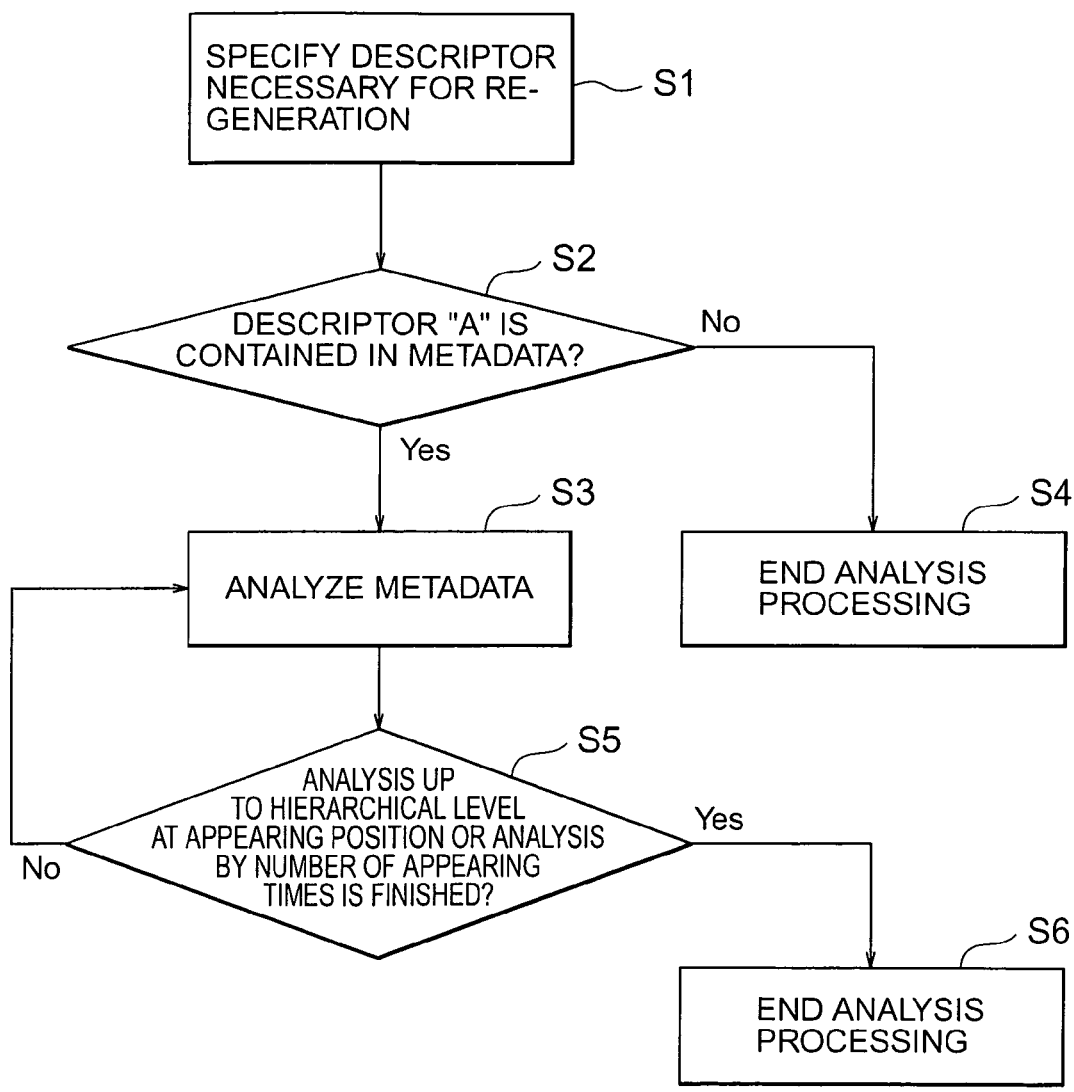
FIG. 18 is a flowchart showing how a metadata analysis/re-generation unit of the metadata delivery server according to the fifth embodiment of the present invention operates.

FIG. 18 shows an example of a method with which the metadata analysis/re-generation unit 63 analyzes the metadata using the analyzed metadata optimization hint information 62. In this example, it is assumed that only video segment characterized by having importance of 0.5 or higher is extracted from the original metadata 49, and metadata composed of only a description concerning the extracted video segment is re-generated.

First, the metadata analysis/re-generation unit 63 specifies metadata necessary for re-generation based on the condition 65 for metadata re-generation (step S1). In this example, only video segment characterized by having importance of 0.5 or higher is extracted, so that "importance" and "video segment" are descriptors necessary for the re-generation.

Next, the analyzed metadata optimization hint information 62 judges whether or not the descriptors specified in step S1 are contained in the metadata 49 (step S2) (the following description will be made by taking a case of the "importance" descriptor as an example).

When the "importance" descriptor is contained in the metadata, analysis of the metadata is performed (step 3). On the other hand, when the "importance" descriptor is not contained, the metadata analysis processing is ended (step S4).

Also, when the analyzed metadata optimization hint information 62 specifies that the appearing position of the "importance" descriptor is up to Level 3 of the hierarchical structure, at the time when the analysis of the video segments up to Level 3 is finished (step S5), the analysis processing is ended without performing the analysis for Level 4 and the following hierarchical levels (step S6).

It should be noted here that in order to perform the analysis of another piece of metadata 49 if necessary, the operations in step S1 and the following steps are repeated. Also, when the metadata optimization hint information 62 specifies that the number of appearing times of the "importance" descriptor is 20, at the time when the analysis of 20 "importance" descriptors is finished (step S5), the analysis of the metadata is ended (step S6). After the metadata analysis processing is ended in step S4 or step S6, in order to perform the analysis of another piece of metadata if necessary, the operations in step S1 and the following steps are repeated.

Figure 19:
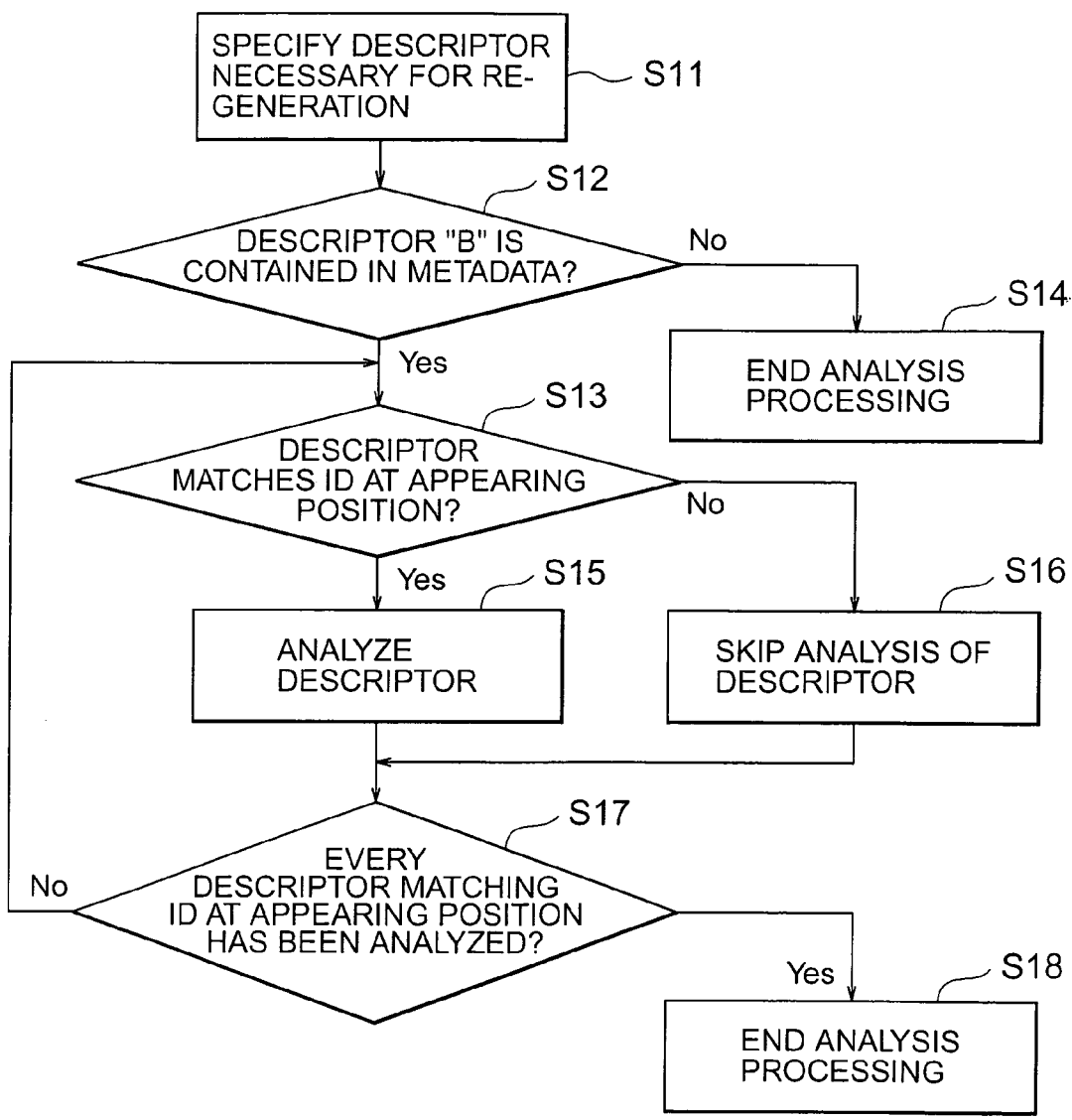
FIG. 19 is another flowchart showing how the metadata analysis/re-generation unit of the metadata delivery server according to the fifth embodiment of the present invention operates.

FIG. 19 shows another example of the method for analyzing the metadata using the analyzed metadata optimization hint information 62. In this example, it is assumed that metadata is re-generated by extracting only video segment containing the "title" descriptor. The judgement whether or not the metadata contains the "title" descriptor is performed in the same manner as in the example shown in FIG. 18.

When the metadata contains the "title" descriptor, the metadata analysis/re-generation unit 63 judges whether or not a video segment matches an appearing position ID described in the metadata optimization hint information 62 (step S13).

When the video segment does not match the ID, the video segment does not contain the "title" descriptor, so that the analysis of the description of this video segment is skipped (step S16).

On the other hand, when the video segment matches the ID, in order to obtain the "title" descriptor, the analysis of the description of this video segment is performed (S15).

Next, when the analysis of every video segment matching the appearing position ID is finished (step S17), no video segment containing the "title" descriptor remains in the metadata, so that the analysis processing is ended (step S18).

It should be noted here that in order to perform the analysis of another piece of metadata if necessary, the operations in step S11 and the following steps are repeated. Then, the metadata 64 restructured using the descriptor extracted through the analysis processing described above is outputted.

The metadata delivery unit 45 delivers the restructured metadata 64 to the client terminals.

It should be noted here that although not shown, after the metadata re-generation, the location of the metadata file, the size of the metadata file, the number of elements appearing in the metadata, and the information concerning the metadata construction elements are also changed. Accordingly, metadata optimization hint information corresponding to the metadata after the re-generation may be re-generated.

It has conventionally been required to analyze every descriptor contained in metadata for metadata re-generation. In the fifth embodiment, however, the descriptor analysis of the metadata 49 is performed in the manner described above using the metadata optimization hint information 60 describing the list of each descriptor contained in the metadata 49, the appearing position of the descriptor, the number of appearing times, and the like. As a result, it becomes possible to omit the analysis of the metadata 49 itself for the metadata re-generation. Also, the analysis of each descriptor not matching the re-generation condition is omitted using the appearing position or the number of appearing times, so that it becomes possible to reduce the processing cost (such as the processing amount and the memory usage amount) required to perform the metadata analysis and re-generation.

Sixth Embodiment

In the fifth embodiment described above, there has been described the metadata delivery server that reduces the processing cost required to perform the metadata analysis and re-generation using the metadata optimization hint information for the metadata re-generation. In this sixth embodiment, however, a metadata search server (metadata search apparatus) will be described which reduces the processing cost required to perform metadata searching using the metadata optimization hint information.

Figure 20:
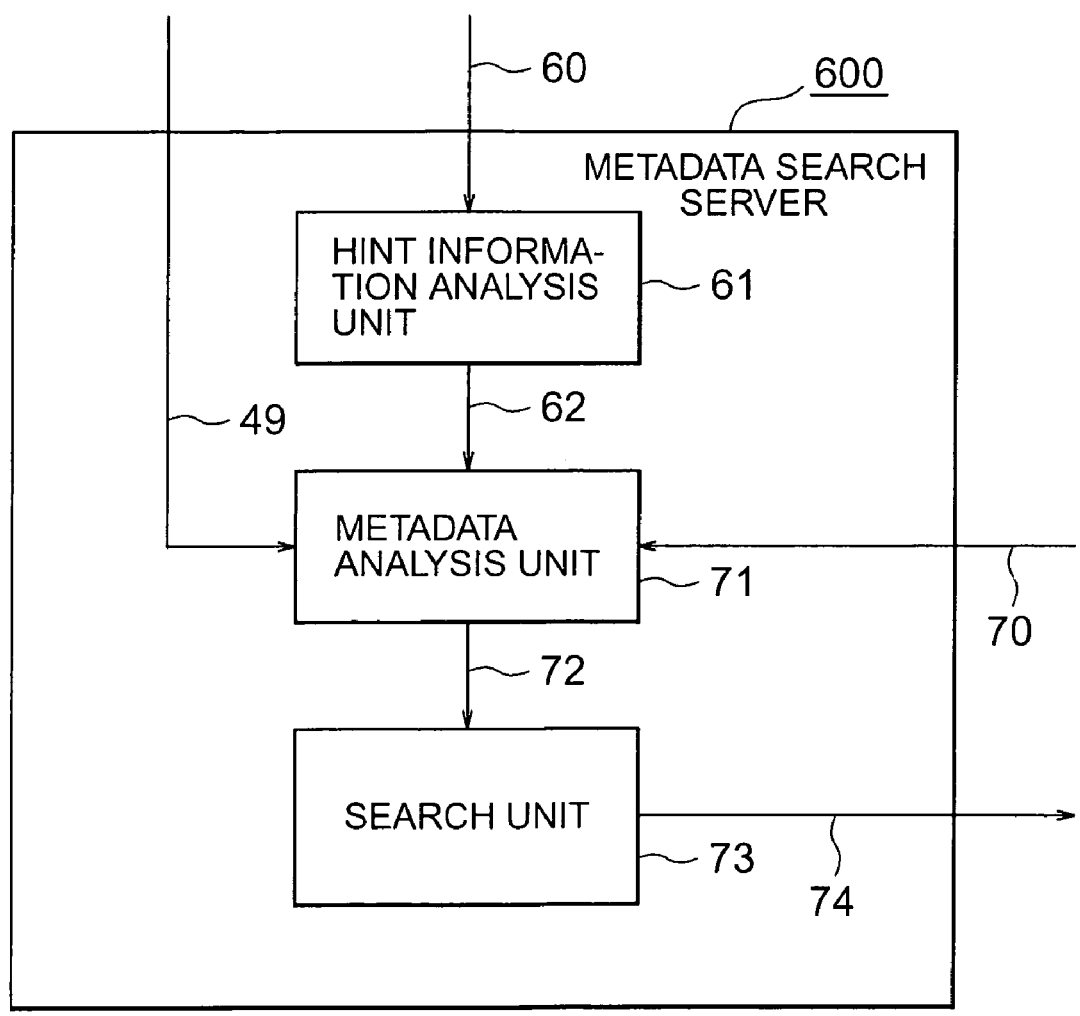
FIG. 20 is a block diagram showing a construction of a metadata search server according to a sixth embodiment of the present invention.

The metadata search server according to the sixth embodiment of the present invention will be described with reference to the accompanying drawings. FIG. 20 is a block diagram showing a construction of the metadata search server according to the sixth embodiment of the present invention.

Referring to FIG. 20, a metadata delivery server 600 includes a hint information analysis unit 61, metadata analysis unit 71, and a search unit 73.

The hint information analysis unit 61 is the same as that in the fifth embodiment described above and therefore the description thereof is omitted in this embodiment. The metadata analysis unit 71 performs analysis of an enormous amount of metadata 49 describing the structure and characteristics of content with efficiency and with a less processing cost using analyzed metadata optimization hint information 62 and a search condition 70. The search unit 73 searches for content matching the search condition using a result 72 of the analysis of the metadata.

Next, how the metadata search server according to the sixth embodiment operates will be described with reference to the accompanying drawings.

Figure 21:
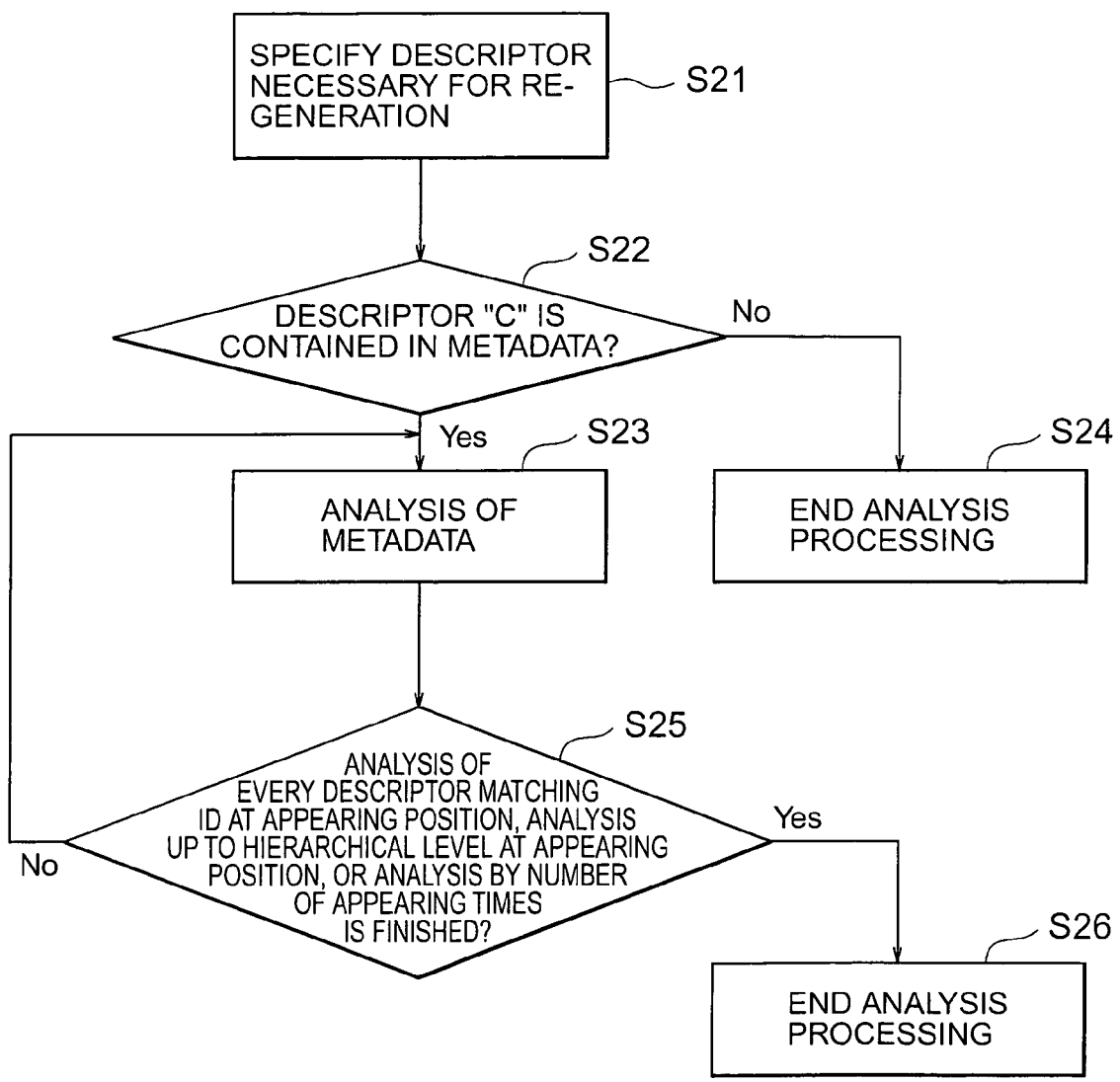
FIG. 21 is a flowchart showing how a metadata analysis unit of the metadata search server according to the sixth embodiment of the present invention operates.

FIG. 21 is a flowchart showing how the metadata analysis unit of the metadata search server according to the sixth embodiment operates.

The metadata analysis unit 71 performs analysis of at least one piece of metadata using the metadata optimization hint information 62 corresponding to the metadata. Here, in this example, the analysis of the metadata is extraction of each characteristic description necessary for the searching from the metadata. When a video segment having specific color characteristic amounts is given as the search condition and each video segment having characteristics close to those of the given video segment will be searched for, for instance, it is required to extract each video segment having a color characteristic description. In the metadata example shown in FIG. 15, a color characteristic description ("color histogram") is added to each video segment at Level 4, so that a description concerning each video segment at Level 4 is extracted.

The metadata analysis unit 71 analyses the search condition 70 and specifies a descriptor that is valid for the searching (step S21). Here, the search condition may be characteristic amounts described in a format defined in MPEG-7. Alternatively, the search condition may be an image, a keyword, or the like. When the characteristic amounts (color arrangement information, for instance) described in the format defined in the MPEG-7 is given as the search condition, each corresponding descriptor (color arrangement information) becomes a descriptor that is valid for the searching. Also, when a keyword is given as the search condition, each descriptor in a text form (such as a title, an abstract, or explanatory notes) becomes the descriptor that is valid for the searching.

Next, by referring to the metadata optimization hint information 62, it is judged whether the selected descriptor is contained in the metadata 49 (step S22). When the descriptor for the searching is not contained in the metadata 49, the analysis processing of the metadata 49 is ended (step S24) and the analysis of another piece of metadata 49 is performed if necessary.

On the other hand, when the selected descriptor is contained in the metadata 49, the analysis of the metadata is performed (step S23). As to a metadata analysis method used in this embodiment, like in the case of the fifth embodiment described above, the metadata analysis processing shown in FIG. 18 or 19 is performed with efficiency using the metadata optimization hint information 62 (steps S25 and S26). As a result of the operations described above, the metadata analysis unit 71 extracts each characteristic description necessary for the searching.

The search unit 73 searches for content matching the search condition using the metadata analysis result (characteristic description necessary for the searching) 72 outputted from the metadata analysis unit 71. In this example, a description concerning each video segment having a color characteristic description ("color histogram") is outputted by the metadata analysis unit 71, so that the search unit 73 judges compatibility with the color characteristic amounts (histogram) given as the search condition and outputs information ("time information", for instance) concerning each video segment, whose judgment result is positive, as a search result 74.

As described above, in the sixth embodiment, the analysis of the metadata 49 is performed using the metadata optimization hint information 60, so that it becomes possible to omit the analysis of the metadata 49 itself for the metadata re-generation. Also, the analysis of each descriptor that is not necessary for the searching is omitted based on the appearing position and the number of appearing times, so that it becomes possible to reduce the processing cost (such as the processing amount and the memory usage amount) required to perform the metadata searching.

Seventh Embodiment

In the fifth embodiment and the sixth embodiment described above, description has been made for a server side that uses the metadata optimization hint information. In this seventh embodiment, however, a client terminal (metadata re-generation condition setting apparatus) will be described which uses the metadata optimization hint information.

Figure 22:
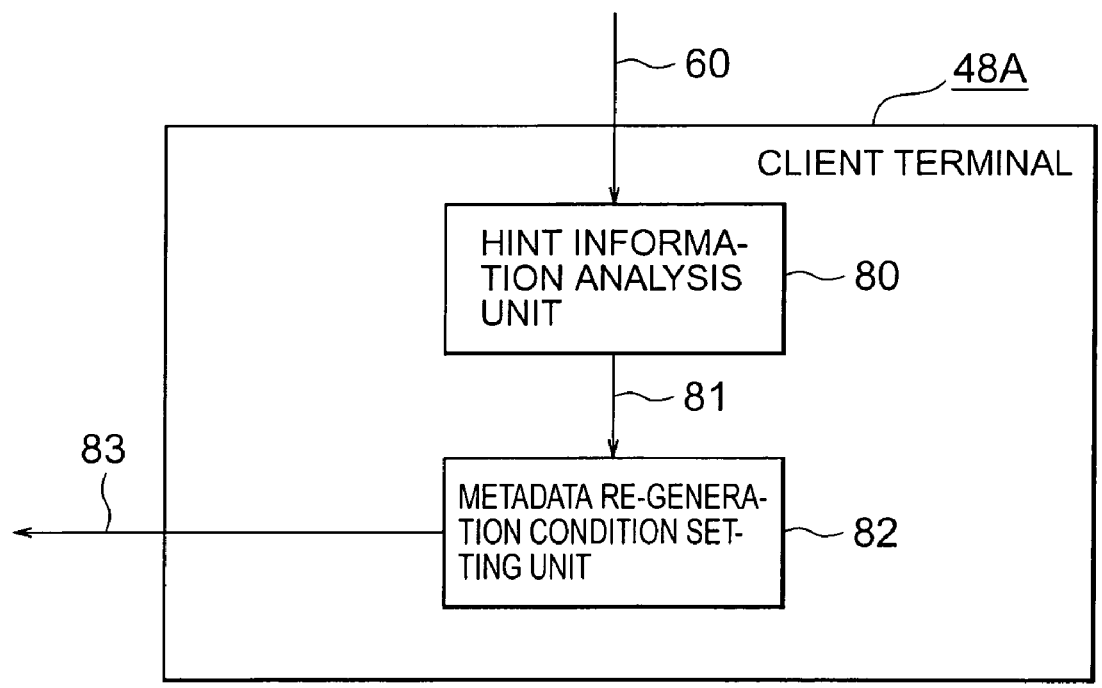
FIG. 22 is a block diagram showing a construction of a client terminal according to a seventh embodiment of the present invention.

The client terminal according to the seventh embodiment of the present invention will be described with reference to the accompanying drawings. FIG. 22 is a block diagram showing a construction of the client terminal according to the seventh embodiment of the present invention.

Referring to FIG. 22, a client terminal 48A includes a hint information analysis unit 80, and a metadata re-generation condition setting unit 82.

It should be noted here that FIG. 22 shows only a portion of the function of the client terminal 48A that relates to means for setting a condition for metadata re-generation using metadata optimization hint information 60.

Next, how the client terminal according to the seventh embodiment operates will be described with reference to the accompanying drawing.

The hint information analysis unit 80 performs analysis of the metadata optimization hint information 60 described in a specified format. This hint information analysis unit 80 is the same as that in the fifth embodiment described above, so that the detailed description thereof is omitted in this embodiment.

Then, the metadata re-generation condition setting unit 82 performs setting of a condition 83 for metadata re-generation based on a result 81 of the analysis outputted from the hint information analysis unit 80. Here, the condition setting refers to selection of each descriptor that is unnecessary for the client terminal 48A from among various descriptors contained in the metadata optimization hint information 60, for instance. When the client terminal 48A is not provided with a search function using characteristic amounts, each descriptor expressing the characteristic amounts, such as a color histogram or motion complexity, is unnecessary.

As another example of the condition setting, when the complexity of the metadata is increased in accordance with an increase in depth in the hierarchical structure describing relations between scenes of content, the depth in the hierarchical structure processible by the client terminal is set based on the maximum value of the depth in the hierarchical structure described in the metadata optimization hint information 60. In still another example, a viewpoint of a user and a threshold value of scene importance are set based on assumable values of the importance described in the metadata optimization hint information 60.

When the importance assumes five discrete values ({0.0, 0.25, 0.5, 0.75, 1.0}) from each of the viewpoints of "Team A" and "Team B" as described above, the condition is set so that only each scene having the importance of 0.5 or higher from the viewpoint of "Team A" is selected, for instance.

The condition 83 for metadata re-generation set by the metadata re-generation condition setting unit 82 is sent to the metadata delivery server. On the metadata delivery server side, the metadata is restructured based on the metadata re-generation condition and the terminal performance of the client terminal. When the maximum value of the depth in the hierarchical structure of the original metadata is four and the depth in the hierarchical structure processible by the client terminal is set at two in the metadata re-generation condition, for instance, the structure of the metadata is restructured so that the maximum value of the depth in the hierarchical structure becomes two.

Also, when the metadata re-generation condition has been set so that only each scene having the importance of 0.5 or higher from the viewpoint of "Team A" is selected, metadata composed of only each scene matching the condition is re-generated. As a result, like in the fifth embodiment described above, it becomes possible to perform the metadata re-generation with efficiency using the metadata optimization hint information.

As described above, in the seventh embodiment, the metadata re-generation condition is set using the metadata optimization hint information 60, so that it becomes possible to generate appropriate metadata in accordance with the client terminal or application.

Eighth Embodiment

In the fifth embodiment and the sixth embodiment described above, there has been described a server that re-generates metadata using the metadata optimization hint information and delivers the re-generated metadata. In this eighth embodiment, however, a content delivery server (content delivery apparatus) will be described which analyzes metadata using the metadata optimization hint information, re-generates content suited for the client terminal or user preferences using a result of the analysis, and delivers the re-generated content.

Figure 23:
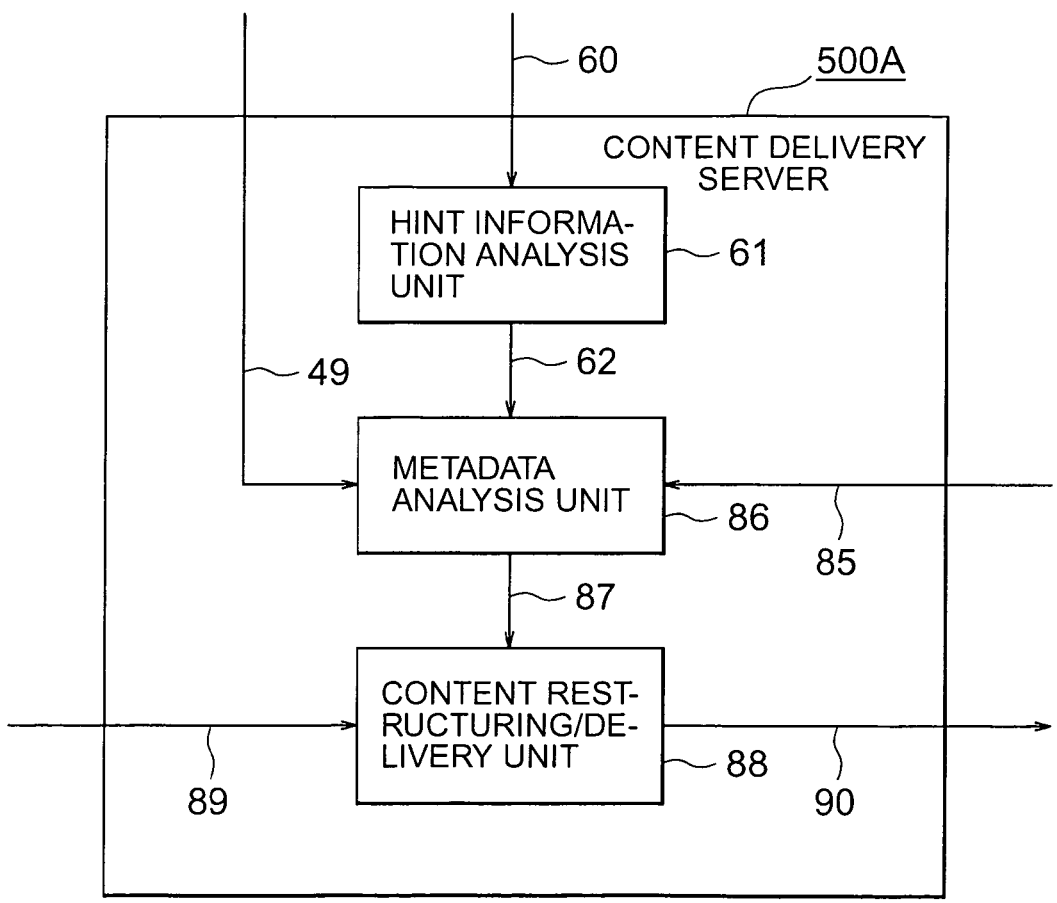
FIG. 23 is a block diagram showing a construction of a content delivery server according to an eighth embodiment of the present invention.

The content delivery server according to the eighth embodiment of the present invention will be described with reference to the accompanying drawings. FIG. 23 is a block diagram showing a construction of the content delivery server according to the eighth embodiment of the present invention.

Referring to FIG. 23, a content delivery server 500A includes a hint information analysis unit 61, a metadata analysis unit and a content restructuring/delivery unit 88.

Next, how the content delivery server according to the eighth embodiment operates will be described with reference to the accompanying drawings.

The hint information analysis unit 61 operates in the same manner as in the fifth embodiment described above, so that the description thereof is omitted in this embodiment.

The metadata analysis unit 86 performs analysis of metadata 49 using analyzed metadata optimization hint information 62 outputted from the hint information analysis unit 61, and extracts each description matching information concerning the client terminal or a condition 85 concerning content restructuring such as user preferences. The analysis using the hint information is the same as that in the fifth embodiment described above. However, this eighth embodiment differs from the fifth embodiment in that not the metadata re-generation but content restructuring is performed using each extracted description. Each description extracted by the metadata analysis unit 86, that is, analyzed metadata 87 is outputted to the content restructuring/delivery unit 88.

The content restructuring/delivery unit 88 performs restructuring of content 89 based on each description extracted by the metadata analysis unit 86. Here, the following description will be made based on the example described in the above fifth embodiment. In the fifth embodiment, only each video segment having the characteristics, whose importance is 0.5 or higher, is extracted from the metadata 49 and metadata composed of only each description concerning the extracted video segment is re-generated.

In a like manner, in this eighth embodiment, only each video segment having characteristics, whose importance is 0.5 or higher, is extracted from the metadata 49 and content 90 composed of only each scene corresponding to the extracted video segment is restructured and is delivered. In the description concerning the extracted video segment, the location of corresponding content and the position (time information) of the video segment in the content are described. Therefore, it is possible to clip each corresponding scene from the content, to restructure a single content 90 using the clipped scene, and to deliver the restructured content 90. Alternatively, it is possible to clip each corresponding scene from the content and to sequentially deliver the clipped scene.

As described above, with the content delivery server 500A according to the eighth embodiment, the metadata analysis is performed using the metadata optimization hint information 60 describing a list of each descriptor contained in the metadata 49, the appearing position of the descriptor, the number of appearing times, and the like, so that it becomes possible to omit the analysis of the metadata 49 itself for the metadata re-generation. Also, the analysis of each descriptor not matching the re-generation condition is omitted using the appearing position and the number of appearing times, so that it becomes possible to reduce the processing cost (such as the processing amount and the memory usage amount) required to perform the metadata analysis and the content restructuring at the time of re-generation and delivery of content suited for the client terminal and user preferences.

INDUSTRIAL APPLICABILITY

As described above, with the present invention, multimedia content containing moving pictures and audio is divided into multiple scenes, editing of the multiple scenes is performed, and metadata that is scene structure information describing the hierarchical structure of the multimedia content is generated. As a result, it becomes possible to generate metadata describing the hierarchical structure possessed by multimedia content containing video data and the like.

The invention claimed is:

1. A metadata editing apparatus comprising:
 a scene division unit for dividing multimedia content containing at least one of moving pictures and audio into a plurality of scenes to generate scene section information metadata indicating a scene start position and a scene end position for each scene obtained as a result of the division;
 a thumbnail image generation unit for extracting a representative frame of each scene as a thumbnail image based on corresponding scene section information metadata sent from the scene division unit and generating thumbnail image information metadata describing position of the thumbnail image in the multimedia content;
 a scene description edit unit for performing hierarchical editing of each scene of the multimedia content based on the scene section information metadata sent from the scene division unit and generating scene structure information metadata describing a hierarchical structure of the multimedia content; and
 a metadata description unit for integrating the scene section information metadata thumbnail image information metadata, and the scene structure information metadata and generating metadata describing contents and a structure of the multimedia content in accordance with a predetermined format.

2. A metadata editing apparatus according to claim 1, further comprising:
 a characteristic extraction unit for extracting visual characteristic amounts of each scene of the multimedia content based on the scene section information metadata sent from the scene division unit and generating characteristic description metadata,
 wherein the metadata description unit integrates the scene section information metadata, the scene structure information metadata, and the characteristic description metadata and generates the metadata describing the contents and the structure of the multimedia content in accordance with the predetermined format.

* * * * *